United States Patent [19]

Ohmori

[11] Patent Number: 5,748,573
[45] Date of Patent: May 5, 1998

[54] MAGNETIC HEAD DRIVING CIRCUIT, INCLUDING MAGNETIC HEAD COIL SWITCHING CIRCUITS AND A CONTROL PULSE GENERATOR FOR THE SWITCHING CIRCUITS, WHICH IS OPERABLE WITH RECORDING DATA TRANSFERRED AT A HIGHER THAN NORMAL TRANSFER RATE

[75] Inventor: Takashi Ohmori, Tokyo, Japan

[73] Assignee: Sony Corporation, Tokyo, Japan

[21] Appl. No.: 727,054

[22] Filed: Oct. 8, 1996

Related U.S. Application Data

[62] Division of Ser. No. 565,008, Nov. 30, 1995, Pat. No. 5,654,943.

[30] Foreign Application Priority Data

Dec. 7, 1994 [JP] Japan ................... 6-330385

[51] Int. Cl.⁶ .................. G11B 11/00; G11B 5/09
[52] U.S. Cl. .................. 369/13; 369/47; 360/59
[58] Field of Search .................. 369/13, 50, 47, 369/48, 54, 32, 109, 110, 116, 124, 44.37; 360/114, 59; 363/98, 17, 63

[56] References Cited

U.S. PATENT DOCUMENTS

| | | | |
|---|---|---|---|
| 4,937,802 | 6/1990 | Omori et al. | 369/13 |
| 5,224,087 | 6/1993 | Maeda et al. | 369/54 |
| 5,278,809 | 1/1994 | Ogata | 369/13 |
| 5,343,452 | 8/1994 | Maeda et al. | 369/32 |
| 5,452,273 | 9/1995 | Onagi | 369/13 |

FOREIGN PATENT DOCUMENTS

| | | |
|---|---|---|
| 0304298 A3 | 2/1989 | European Pat. Off. . |
| 0399978 A2 | 11/1990 | European Pat. Off. . |
| 0545579 A1 | 6/1993 | European Pat. Off. . |
| 0559469 A2 | 9/1993 | European Pat. Off. . |
| 0622792 A2 | 11/1994 | European Pat. Off. . |

OTHER PUBLICATIONS

Patent Abstracts of Japan, vol. 15, No. 466 (P-1280). JP 3-198204, Sony Corporation, Published Aug. 29, 1991.

Primary Examiner—Ali Neyzari
Attorney, Agent, or Firm—Limbach & Limbach LLP

[57] ABSTRACT

In a magneto-optical recording apparatus wherein a beam of light is irradiated upon a face of a recording medium while a magnetic field is applied to the other face of the recording medium at a location where the light beam is irradiated, production of control pulses for controlling the magnetic head so as to prevent, upon high speed recording, the magnetic head from being turned on before a terminal voltage of the magnetic head drops sufficiently to a predetermined power source voltage because the transfer rate of a recording signal is high and the reversal interval of the recording signal is short.

3 Claims, 20 Drawing Sheets

RECORDING SIGNAL

ELECTRIC CURRENT

MAGNETIC FIELD

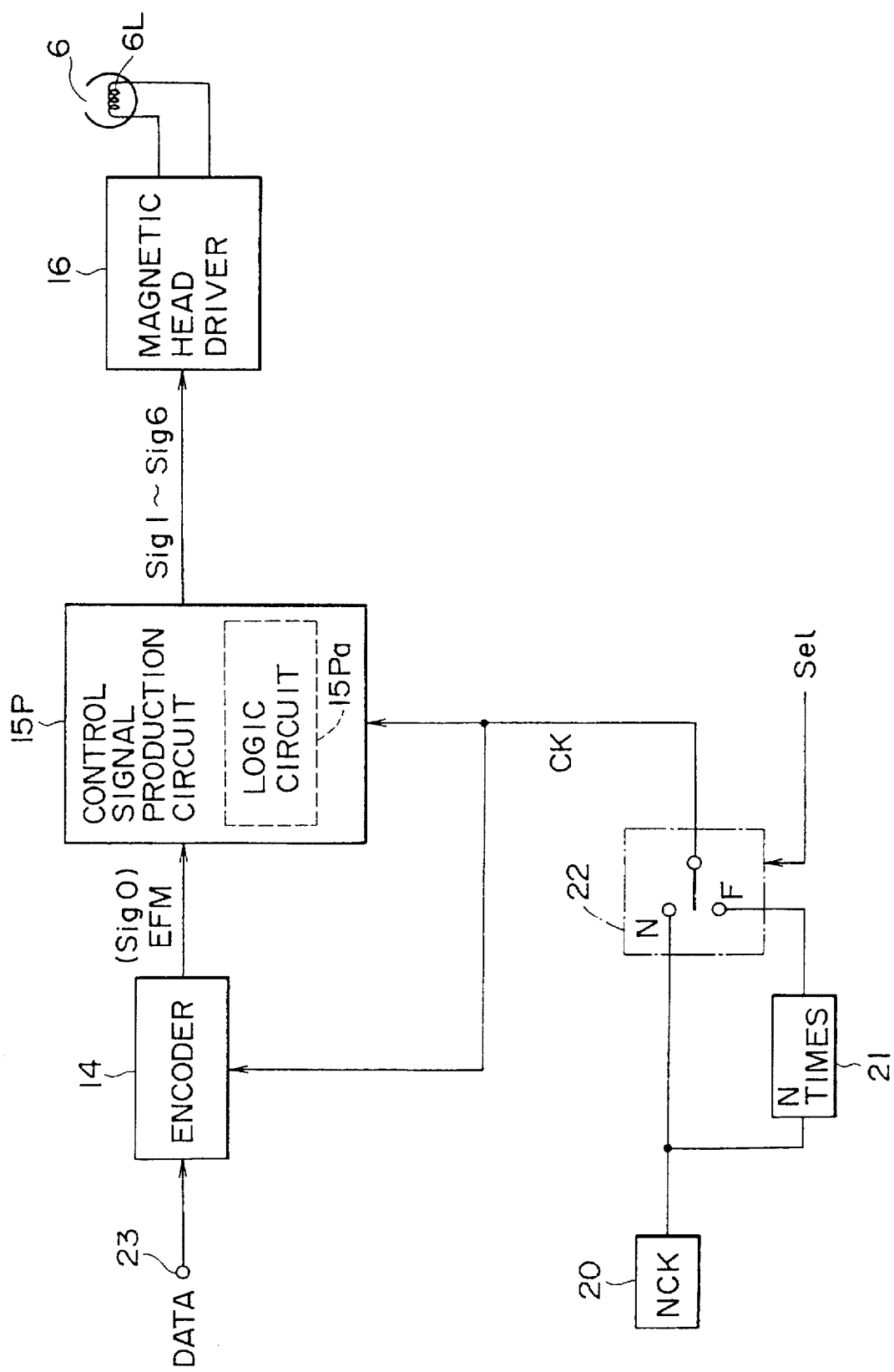

FIG. 9A Sig 1
FIG. 9B Sig 3
FIG. 9C Sig 5
FIG. 9D Ih
FIG. 9E Vh1

FIG. 10A  Sig 1
FIG. 10B  Sig 3
FIG. 10C  Sig 5
FIG. 10D  Vh1

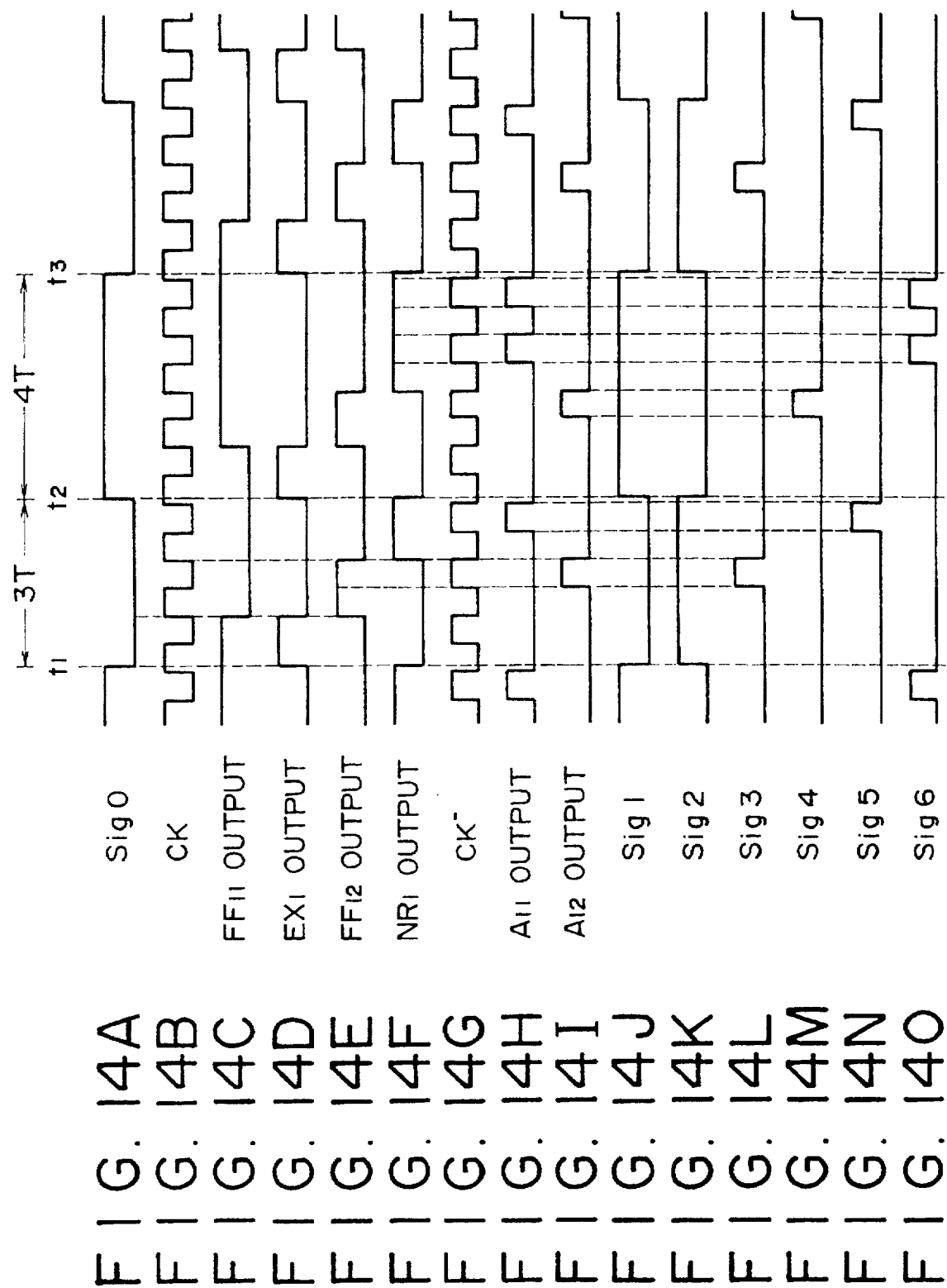

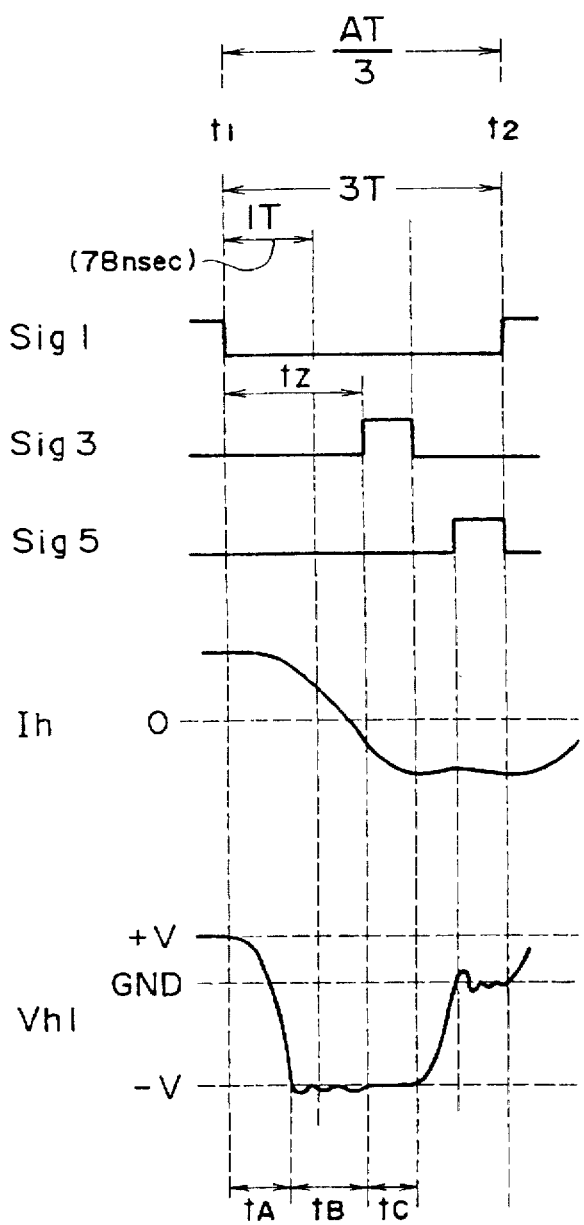

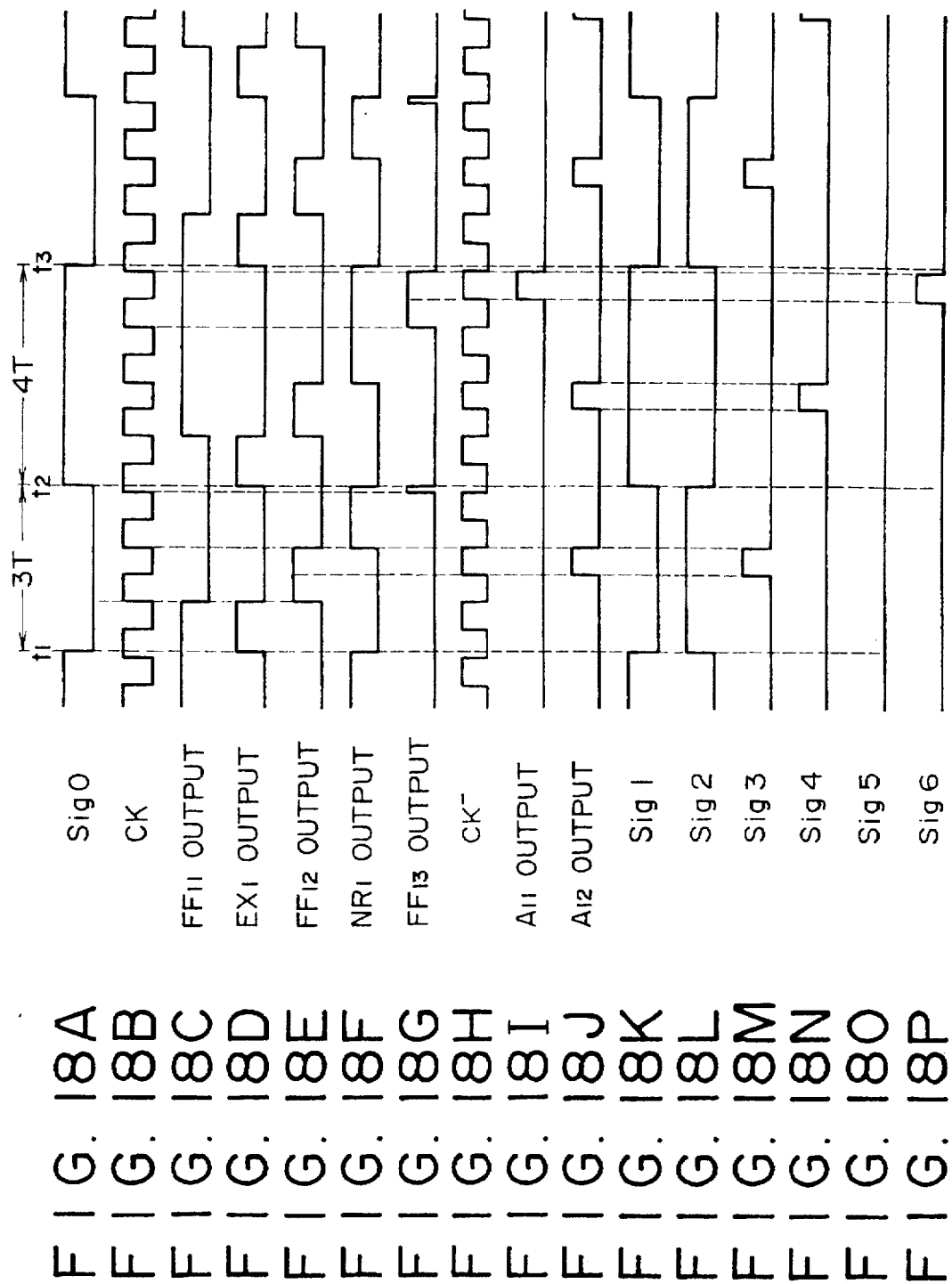

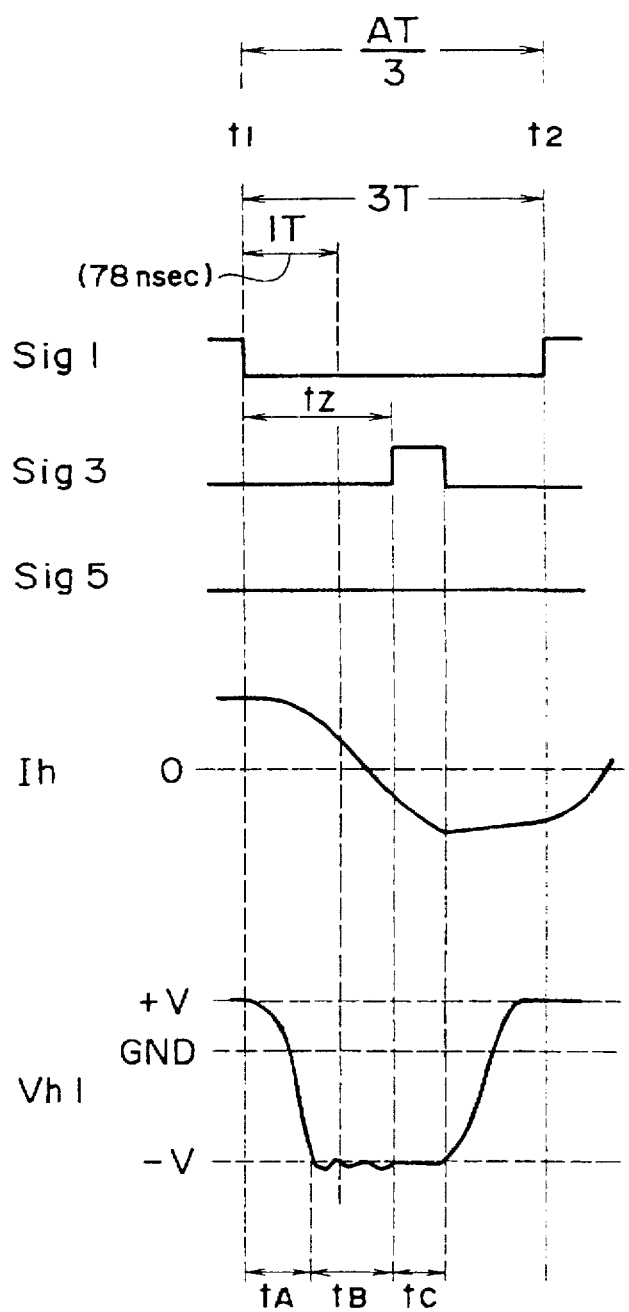

MAGNETIC HEAD DRIVING CIRCUIT, INCLUDING MAGNETIC HEAD COIL SWITCHING CIRCUITS AND A CONTROL PULSE GENERATOR FOR THE SWITCHING CIRCUITS, WHICH IS OPERABLE WITH RECORDING DATA TRANSFERRED AT A HIGHER THAN NORMAL TRANSFER RATE

This is a divisional of Application No. 08/565,008, filed Nov. 30, 1995 now U.S. Pat. No. 5,654,943.

BACKGROUND OF THE INVENTION

1. Field of the Invention

This invention relates to a recording apparatus which adopts a magneto-optical recording method.

2. Description of the Related Art

In recent years, a magneto-optical disk has been put into practical use as a recording medium for music and/or data, and a system is known wherein music or data can be not only reproduced from but also recorded onto a magneto-optical disk by a user.

As a magneto-optical recording method for a magneto-optical disk, a magnetic modulation method is adopted widely.

In the case where the magnetic modulation method is adopted, as shown in FIG. 1, a recording head for a disk 91 is so constructed that an optical head 92 faces to a magnetic head 93 in such a manner as to put the disk 91 therebetween. The disk 91 has a vertically magnetized film 91a thereon. The optical head 92 includes an objective lens 94.

Upon recording operation, a laser beam is irradiated from the optical head 92 upon the vertically magnetized film 91a to raise the temperature of a recording portion of the disk 91 to a temperature (approximately 180° C.) higher than the Curie temperature. Thereupon, a magnetic field of the N or S pole is applied from the magnetic head 93 to the vertically magnetized film 91a so that a magnetic pattern is recorded onto the vertically magnetized film 91a. Accordingly, recording of data onto the disk 91 is realized when the magnetic head 93 generates a magnetic field of the N or S polarity in accordance with data to be recorded.

When recording is performed in accordance with the magnetic field modulation method, if the recording signal has such a rectangular waveform as shown in FIG. 2A, the electric current flowing through a coil 93a of the magnetic head 93 has such an integration waveform having a certain time constant as seen in FIG. 2B. Meanwhile, the magnetic field produced by the magnetic head 93 has such an integration waveform substantially equal to the waveform of the electric current as seen in FIG. 2C. It is to be noted that reference character Id in FIG. 2B indicates a driving electric current and Hd indicates an intensity of the magnetic field corresponding to the driving electric current Id.

Generally, in a magneto-optical recording system in which an optical head and a magnetic head are used in this manner, the magnetic head must give a sufficient magnetic field to a range of movement of a lens of the optical head in a tracking direction.

In almost every apparatus, the range of movement of the lens in the tracking direction is a region of the diameter of 0.6 to 1 mm. Meanwhile, the magnetic head disposed in an opposing relationship to the optical head includes an E-shaped core. The E-shaped core has at a central portion thereof a rectangular parallelepiped center pole wound with a coil and at the opposite ends thereof a pair of rectangular parallelepiped side yokes which serve as side paths of a magnetic field.

The sectional area of the center pole is set so as to correspond to the diameter of 0.6 to 1 mm, which is the range of movement of the lens in the tracking direction, in order to assure a maximum efficiency. Further, in order to assure a high efficiency of a winding on the center pole, the cross section of the winding portion of the center pole is set substantially to a square shape.

It is known that, in order to reduce the resistance of the winding and assure a sufficient number of turns under the conditions described above, preferably a wire having a diameter of 50 to 100 μm is wound by a winding number of 30 to 40 turns. Further, where ferrite is used as a material of the core, the coil has an inductance L of approximately 4 to 6 μH and a resistance value of 0.5 to 1Ω.

Those values are substantially fixed even if the other parameters are varied. Accordingly, a driving circuit for the magnetic head can obtain sufficient characteristics in practical use by optimization with L=5 μH.

In recent years, a system in which such magneto-optical disk recording apparatus is applied for music data has been put into practical use.

Recording data for driving a magnetic head undergo EFM modulation (Eight-Fourteen (8–14) modulation), and such EFM data are pulse signals which exhibit a pulse reversal interval ranging from 3T at minimum to 11T at maximum. The transfer rate of the EFM signal is set to a rate of T=230 nsec, and a magnetic recording operation of a magnetic head based on an EFM signal of this transfer rate is optimized.

While the transfer rate is sufficiently high for music data, a higher transfer rate is desired for recording or reproduction of, for example, data for a computer or moving picture data.

A circuit construction of a magnetic head driving system which can switchably use an ordinary transfer rate (for music applications) and a high transfer rate (for computer data or the like) is shown in FIG. 3.

Referring to FIG. 3, data such as audio data are supplied from a terminal 23 to an encoder 14. At the encoder 14, the data undergo CIRC (Cross Interleaved Reed Solomon Code) encoding, EFM modulation and some other necessary processing, to form an EFM signal.

The EFM signal is supplied to a control signal production circuit 15P. The control signal production circuit 15P includes a logic circuit 15Pa and produces and outputs control signals Sig1 to Sig6 for a magnetic head driving circuit 16 based on the EFM signal (Sig0). The magnetic head driving circuit 16 allows an electric current to flow into a coil 6L of a magnetic head 6 in response to the control signals Sig1 to Sig6 so that a magnetic field may be applied from the magnetic head 6 to a disk not shown in FIG. 3.

A clock generation section 20 generates a clock signal for operation at an ordinary transfer rate. A clock frequency variation section 21 multiplies the frequency of the clock signal from the clock generation section 20 by the number N, to produce another clock signal for operation at a high transfer rate. Either the clock signal for the ordinary rate from the clock generation section 20 or the clock signal for the high rate from the clock frequency variation section 21 is selected by a switching operation of a switch 22 in response to a switching signal Se1 from a control section or a like element not shown. The selected clock signal is supplied as a processing clock signal CK to the encoder 14 and the control signal production circuit 15P.

Specifically, when the switch 22 is connected at an N terminal thereof, a recording operation is performed at the ordinary transfer rate, but when it is connected at an F terminal thereof, a recording operation is performed at the high transfer rate, for example, a rate equal to twice the ordinary transfer rate.

The magnetic head driving circuit 16 is constructed as shown in FIG. 4.

Referring to FIG. 4, the magnetic head driving circuit 16 includes switching elements $SW_1$ to $SW_6$ to which the control signals Sig1 to Sig6 from the control signal production circuit 15P are inputted as switching control signals, respectively.

A head terminal $h_1$ connected to the coil 6L of the magnetic head 6 is connected to a positive dc power source 16a by way of the switching element $SW_1$ and is grounded by way of the switching element $SW_5$. Further, the head terminal $h_1$ is connected to a negative dc power source 16b by way of the switching element $SW_3$ and also by way of a diode $D_1$.

Another head terminal $h_2$ connected to the other end of the coil 6L of the magnetic head 6 is connected to the positive dc power source 16a by way of the switching element $SW_2$ and is grounded by way of the switching element $SW_6$. Further, the head terminal $h_2$ is connected to the negative dc power source 16b by way of the switching element $SW_4$ and also by way of a diode $D_2$.

The potential +V of the positive dc power source 16a is set, for example, to +5 V, and the potential −V of the negative dc power source 16b is set, for example, approximately to −45 V. Further, the ground is used as a power source of the 0 V potential.

The logic circuit 15Pa of the control signal production circuit 15P which supplies the control signals Sig1 to Sig6 to the magnetic head driving circuit 16 is constructed as shown in FIG. 5 and produces the control signals Sig1 to Sig6 using the EFM signal (Sig0) and the clock signal CK.

Referring to FIG. 5, the EFM signal is supplied as the signal Sig0 to a terminal 50. Meanwhile, the clock signal CK is supplied to a terminal 57 by way of the switch 22 of FIG. 3.

The logic circuit 15Pa includes inverters $IV_1$ to $IV_7$, flip-flops $FF_1$ and $FF_2$, AND gates $A_1$ to $A_7$, and delay circuits $DL_1$ and $DL_2$. The logic circuit 15Pa has output terminals 51 to 56 for outputting the control signals Sig1 to Sig6, respectively.

Operation of the logic circuit 15Pa will be described with reference to FIGS. 6A to 6O.

It is assumed that such a signal Sig0 (EFM signal) as seen in FIG. 6A is supplied from the terminal 50 and such a clock signal CK as seen in FIG. 6B is supplied from the terminal 57. Reference characters $t_1$, $t_2$ and $t_3$ each denote a reversal timing of the EFM signal, and in FIG. 6A, the signal Sig0 has a reversal interval of 3T from $t_1$ to $t_2$ and another reversal interval of 4T from $t_2$ to $t_3$. Operation when the signal Sig0 is such as just described will be described below.

The signal Sig0 is first supplied directly to the terminal 51. As seen from FIG. 6J, the signal Sig0 and the control signal Sig1 are the same signal.

Further, the signal Sig0 is logically inverted by the inverter $IV_1$ and supplied as the control signal Sig2 to the terminal 52. The control signal Sig2 is such a control signal as seen from FIG. 6K.

The inverter $IV_2$, the flip-flop $FF_1$ and the AND gate $A_1$ function as a falling edge detection circuit, and the signal Sig0 is supplied to the inverter $IV_2$ and the D terminal of the flip-flop $FF_1$. The flip-flop $FF_1$ performs a latching operation in response to the clock signal CK and outputs such a Q output as shown in FIG. 6C. The output of the inverter $IV_2$ exhibits a waveform similar to that of the control signal Sig2 of FIG. 6K. The AND gate $A_1$ performs AND-operation for the Q output of the flip-flop $FF_1$ and the output of the inverter $IV_2$, and the output thereof is shown in FIG. 6D. As seen from FIG. 6D, the AND output provides a falling edge detection pulse outputted in response to each falling edge of the signal Sig0. The falling edge detection pulse is supplied to the AND gate $A_4$ and is also supplied to the AND gate $A_5$ by way of the inverter $IV_6$.

The signal Sig0 is being inverted by the inverter $IV_4$ and supplied to the AND gate $A_5$.

Meanwhile, the invertor $IV_3$, the flip-flop $FF_2$ and the AND gate $A_2$ function as a rising edge detection circuit, and the signal Sig0 is supplied, after inverted by the inverter $IV_1$, to the inverter $IV_3$ and the D terminal of the flip-flop $FF_2$. The flip-flop $FF_2$ performs a latching operation in response to the clock signal CK and provides such a Q output as shown in FIG. 6E. The output of the inverter $IV_3$ exhibits a waveform similar to that of the control signal Sig1 of FIG. 6J. The AND gate $A_2$ performs AND-operation for the Q output of the flip-flop $FF_2$ and the output of the inverter $IV_3$ and provides a rising edge detection pulse which is outputted in response to each rising edge of the signal Sig0 as seen from FIG. 6F. The rising edge detection pulse is supplied to the AND gate $A_6$ and is also supplied to the AND gate $A_7$ by way of the inverter $IV_7$.

The signal Sig0 is inverted again, after being inverted by the inverter $IV_1$, by the inverter $IV_5$ again and supplied to the AND gate $A_7$.

The delay circuit $DL_1$ delays the clock signal CK to produce a delayed clock signal $CK_{D1}$ of FIG. 6G. The delay circuit $DL_2$ delays the delayed clock signal $CK_{D1}$ to produce another delayed clock signal CKD2 of FIG. 6H. The delayed clock signal $CK_{D1}$ and the delayed clock signal $CK_{D2}$ are supplied to the AND gate $A_3$ so that a reference pulse signal illustrated in FIG. 6I is produced by the AND gate $A_3$. The reference pulse signal is supplied to the AND gates $A_4$, $A_5$, $A_6$ and $A_7$.

The AND gate $A_4$ performs AND-operation for the falling edge detection pulse signal from the AND gate $A_1$ and the reference pulse signal from the AND gate $A_3$ to produce the control signal Sig3 as shown in FIG. 6L. The control signal Sig3 is outputted from the terminal 53.

The AND gate $A_6$ performs AND-operation for the rising edge detection pulse signal from the AND gate $A_2$ and the reference pulse signal from the AND gate $A_3$ to produce the control signal Sig4 as shown in FIG. 6M. The control signal Sig4 is outputted from the terminal 54.

The AND gate $A_5$ performs AND-operation for the output of the invertor $IV_4$, the output of the invertor $IV_6$ and the reference pulse signal and produces the control signal Sig5 as shown in FIG. 6N. The control signal Sig5 is outputted from the terminal 55.

The AND gate $A_7$ performs AND-operation for the output of the invertor $IV_5$, the output of the invertor $IV_7$ and the reference pulse signal to produce the control signal Sig6 as shown in FIG. 6O. The control signal Sig6 is outputted from the terminal 56.

The control signals Sig1 to Sig6 produced in such a manner as described above are supplied as control pulse signals to the switching elements $SW_1$ to $SW_6$ of the magnetic head driving circuit 16 of FIG. 4, respectively. Operation of the magnetic head driving circuit 16 based on the control signals Sig1 to Sig6 will be described below. It is to be noted that the description of the operation is given in connection with the points of time $t_1$ and $t_2$ between which the EFM signal exhibits the minimum reversal interval of 3T.

Signals are possibly outputted with a "H" level from the control signal production circuit 15P within a period within which the EFM signal (=Sig1) exhibits a "L" level. These signals are the control signals Sig3 and Sig5 as apparently seen from FIGS. 6L and 6N. In particular, with the period, in the magnetic head driving circuit 16, principally the switching elements $SW_3$ and $SW_5$ operate to control the electric current to the coil 6L.

The magnetic head driving circuit 16 of FIG. 4 upon reversal of the EFM signal can be represented as such an equivalent circuit as shown in FIG. 7.

Referring to FIG. 7, it is assumed that the switch 22 of FIG. 3 is connected at the N terminal thereof and the magnetic head driving system is operating at the normal transfer rate. In this instance, T=230 nsec. FIGS. 8A to 8E show timing charts of the control signals Sig1, Sig3 and Sig5, the head current Ih flowing through the coil 6L and the voltage $Vh_1$ at the head terminal $h_1$.

The peak value of the head current Ih is approximately 0.5 A, and +V of the waveform diagram of the head terminal voltage $Vh_1$ is approximately +5 V and $-V$ is approximately $-45$ V.

Transition of the head current Ih and the head terminal voltage $Vh_1$ will be described beginning with the position of a rising edge of the control signal Sig1.

In a condition immediately prior to a signal reversal (immediately prior to the point of time $t_1$), that is, at a timing of the "H" level immediately before the control signal Sig1 changes to the "L" level, as can be seen apparently from FIGS. 6J to 6O, the control signals Sig2 to Sig5 exhibit the "L" level while the control signal Sig6 exhibits the "H" level. Consequently, the switching elements $SW_1$ and $SW_6$ exhibit an on-state while the other switching elements exhibit an off-state. Thus, in the magnetic head driving circuit 16, an electric current flows along a path of +V→switching element $SW_1$→head terminal $h_1$→coil 6L→head terminal $h_2$→switching element $SW_6$→ground (refer to FIG. 4). In the case of the present example, it is assumed that an electric current of approximately 0.5 A flows in the direction of the head terminal $h_1 \rightarrow h_2$.

Thereafter, at the point of time $t_1$, the control signal Sig1 is reversed to the "L" level while the control signal Sig2 is reverted to the "H" signal. From this point of time, the waveforms vary as seen in FIGS. 8A to 8E. This will be described below with reference to an equivalent circuit shown in FIG. 7.

First, at the reversal point of time t1, the switching elements $SW_1$, $SW_3$ and $SW_5$ are all off, and the head terminal $h_1$ is disconnected from any voltage source. Meanwhile, since the switching element $SW_2$ is on (not shown), the head terminal $h_2$ is fixed to the +V voltage as can be seen from FIG. 7.

Movement of charge is governed by an electromotive force, produced by an inductance of the coil 6L, which allows charge to flow in the direction of the head terminal $h_1 \rightarrow h_2$. Consequently, an operation is performed in a direction in which charge is sucked from the head terminal $h_1$ and discharged to the terminal of the head terminal $h_2$. Since the head terminal $h_2$ is fixed to the +V voltage, the charge is circulated back to the +V voltage source (positive dc power source 16a) side.

Since the head terminal $h_1$ side is disconnected from all of the voltage sources, it sucks charge from a small floating capacitance. Accordingly, the voltage $Vh_1$ of the head terminal $h_1$ drops rapidly. As the voltage drop proceeds, the coil current Ih decreases little by little. Thus, an operation which can be seen from a $t_A$ period of FIG. 8E is performed.

The voltage drop described above reaches the $-V$ potential and is fixed there by the voltage source for $-V$ by way of the diode $D_1$. Within a period after the $-V$ potential is reached until the switching element $SW_3$ is turned on by the control signal Sig3, that is, within a $t_B$ period of FIG. 8E, charge moves from the $-V$ power source (negative dc power source 16b) to the head terminal $h_1$ side by way of the diode $D_1$.

Thereafter, when the control signal Sig3 changes to the "H" level and the switching element $SW_3$ is turned on, the head terminal $h_1$ is short-circuited to the $-V$ power source (negative dc power source 16b). Consequently, the voltage $Vh_1$ of the head terminal $h_1$ is fixed to $-V$ as seen within a $t_c$ period of FIG. 8E. By the operation described above, the head current Ih exhibits such a variation as seen in FIG. 8D. It is understood that the direction of the head current Ih flowing through the coil 6L is changed over in response to the reversal of the EFM signal (=Sig1).

Thereafter, when the control signal Sig3 changes to the "L" level to turn off the switching element $SW_3$ so that the head terminal $h_1$ is disconnected from the power sources, charge moves to the head terminal $h_1$ side due to an electromotive force in the direction of the head terminal $h_2 \rightarrow h_1$ produced by the inductance L of the coil 6L. Consequently, the voltage $Vh_1$ of the head terminal $h_1$ approaches +V promptly. Thereafter, the head current Ih decreases gradually. However, since the switching element $SW_5$ is turned on by the control signal Sig5 and the head terminal $h_1$ is grounded, the head current Ih thereafter increases again with a slope which depends upon a potential difference between the head terminals $h_1$ and $h_2$.

In particular, during the period in which the control signal Sig1 remains at the "L" level after the control signal Sig3 is turned off, the control signal Sig5 is supplied at a required timing so that the head current Ih is kept substantially fixed as seen from FIG. 8D.

By the operations described above, as seen from FIGS. 8A to 8E, within the period of $t_1$ to $t_2$, i.e. during a duration of 3T, an electric current flows in the direction of the head terminal $h_2 \rightarrow h_1$ in response to the EFM signal of the "L" level, that is, in response to the control signal Sig1, and a magnetic field is generated from the magnetic head 6 in accordance with the direction of the electric current.

Further, within the period from $t_2$ to $t_3$ shown in FIGS. 6J, 6K, 6M and 6O, an electric current flows in the direction of the head terminal $h_1 \rightarrow h_2$ by similar operations by the control signals Sig1, Sig2, Sig4 and Sig6, and within this period of 4T, a magnetic field is generated from the magnetic head 6 in accordance with the direction of the electric current.

Since the inductance L of the coil of a magnetic head for practical use is substantially fixed, the rise time ($t_A$ in FIGS. 8A to 8E) is fixed. This can be calculated by the following expressions.

In the following, a time until charge of the coil is discharged is calculated approximately.

$$V = -(d\Phi/dt) \quad (1)$$

$$\Phi = Li \quad (2)$$

From the expressions (1) and (2), $$V = -L(di/dt) \quad (3)$$

(wherein L does not vary with respect to time).

Here, the expression (3) can be represented as $$V = -L(\Delta i/\Delta t) \quad (4)$$

Here, the following values are substituted into the expression (4).

V is V=(−V)−(+V), and it is assumed that, with regard to the magnetic head driving circuit 16, V=−45−5= −50 V. Further, it is assumed that L=5×10⁻⁶ (H), and Δi is the electric current value of 0.5 A exhibited at an initial stage.

Consequently, $$-50 = -5 \times 10^{-6} \times 0.5/\Delta t$$

and therefore, $$\Delta t = 0.5 \times 10^{-7} \text{ (sec)} = 50 \text{ nsec}$$

Consequently, the rise time $t_A$ is approximately 50 nsec.

As an error factor other than that described above, it is considered that the voltage V produced by a magnetic head is lower than −50 V and it requires a longer time than 50 nsec to discharge the charge. Meanwhile, since $t_A$ is a time required to reach −50 V, it is smaller than the value (discharging time of the charge). Accordingly, the two factors cancel each other, and actually the rise time $t_A$ can be approximated to 50 nsec.

A recording operation at a rate twice that of the construction of the magnetic head driving circuit 16 described above will be examined. In this instance, the switch 22 of FIG. 3 is connected to the F terminal side thereof, and a clock signal having a frequency equal to twice that in a normal operation is supplied as the processing clock signal CK. In this instance, the control signal production circuit 15P, the magnetic head driving circuit 16 and the magnetic head 6 are used as they are.

Timing charts upon a recording operation at the high rate are shown in FIGS. 9A to 9E.

As can be seen by comparison with FIGS. 8A to 8E, the absolute time of, for example, the period of 3T is AT/2 in FIGS. 9A to 9E with respect to the time illustrated in FIGS. 8A to 8E. As seen from FIGS. 9A to 9E, the control signals Sig1, Sig3 and Sig5 are pulse signals whose time base is ½ that in the case of FIGS. 8A to 8E (T≈115 nsec).

Meanwhile, the rise time $t_A$ is the same as that at the normal rate in the case of FIGS. 8A to 8E because it relies upon the coil 6L and the magnetic head driving circuit 16. Due to the fact that the rise time $t_A$ is the same, in the case of FIGS. 9A to 9E, the $t_B$ period, that is, the period after the voltage $Vh_1$ reaches −V until the control signal Sig3 changes to the "H" level, is very short. In this instance, the time from a falling edge of the control signal Sig1 to a rising edge of the control signal Sig3 is approximately 58 nsec and is only a little longer than the rise time $t_A$ of approximately 50 nsec.

The effect of the fact that the period $t_B$ becomes short is, upon the head current Ih, merely that the amplitude decreases a little, and does not matter in practical use. In other words, it is possible to perform a recording operation at twice the rate while the construction described above is maintained.

However, where the magnetic head driving system described above is applied for computer data or the like, recording of a further high speed is demanded. Actually, if the rate in audio applications is considered a normal rate, it is demanded to realize a recording operation of a rate higher than three times the normal rate or more.

Here, a case is examined wherein a clock signal of a rate equal to three times the normal rate is outputted from the clock frequency variation section 21 of FIG. 3 and supplied to the encoder 14 and the control signal production circuit 15P by way of the F terminal of the switch 22 so that an operation at the three time transfer rate is performed.

Timing charts of the operation of the magnetic head driving circuit 16 at the three time rate are shown in FIGS. 10A to 10D.

In this instance, as can be seen from comparison with FIGS. 8A to 8E, the absolute time of, for example, the period of 3T is reduced to AT/3, and as seen from FIGS. 10A to 10D, the control signals Sig1, Sig3 and Sig5 become pulse signals whose time base is reduced to ⅓ comparing with that in FIGS. 8A to 8E (T≈78 nsec).

Since the time from a falling edge of the control signal Sig1 to a rising edge of the control signal Sig3 is approximately (½)T, it is approximately 39 nsec.

However, the rise time $t_A$ remains approximately 50 nsec and does not exhibit a variation from that at the normal rate shown in FIGS. 8A to 8E.

In other words, as can be seen from FIGS. 10A to 10D, at a point of time at which the control signal Sig3 rises, the voltage $Vh_1$ of the head terminal $h_1$ does not reach the −V potential as yet.

Consequently, the energy given by the product of ΔV which is the difference between the voltage $Vh_1$ and the −V potential and the head current Ih when the control signal Sig3 changes to the "H" level and the switching element $SW_3$ is turned on is processed by the switching element $SW_3$. This signifies that the construction by a high speed switching element is impossible. In particular, in the condition of the rate up to twice the normal rate, since, at the point of time of a rising edge of the control signal Sig3, ΔV≈0 and the energy to be processed ≈0, the construction by a high speed switching element is impossible.

Thus, the conventional magnetic head driving system of the construction described above cannot be applied when a high speed operation of three or more times a normal rate is intended.

SUMMARY OF THE INVENTION

It is an object of the present invention to provide a recording apparatus including a magnetic head driving circuit system enabling high speed recording at a high rate equal to or more than three times a normal rate.

In order to attain the object described above, according to an aspect of the present invention, there is a magnetic head driving circuit, comprising power sources for providing at least a first power source voltage and a second power source voltage lower than the first power source voltage, a first switcher for switching connection to one end of a coil of a magnetic head at least between the first and second power source voltages, a second switcher for switching connection to the other end of the coil of the magnetic head at least between the first and second power source voltages, a control pulse generator for producing a control pulse for controlling the first switchers so that the second power source voltage may be connected to the one end of the coil of the magnetic head or another control signal for controlling the second switcher so that the second power source voltage may be connected to the other end of the coil of the magnetic head after a delay of a predetermined time after a reversal edge of a pulse reversal interval, which is given by n×T, of a recording signal, T being a transfer rate of the recording signal, n being a positive integral number, and a driver for driving the first and second switchers in response to the control pulse from the control pulse generator.

According to yet a further aspect of the present invention, there is provided a magnetic head driving circuit, comprising power sources for providing at least a first power source voltage and a second power source voltage lower than the first power source voltage, a first switcher for switching connection to one end of a coil of a magnetic head at least between the first and second power source voltages, a second switcher for switching connection to the other end of the coil of the magnetic head at least between the first and second power source voltages, a first control pulse generator for producing a control pulse for controlling the first and second switchers so that a total number of control pulses to be produced by the first and second switchers within a pulse reversal interval, which is given by n×T, of a recording signal may be smaller than n, T being a transfer rate of the recording signal, n being a positive integral number, a second control pulse generator for producing a control pulse for controlling the first and second switchers so that the total number of control pulses to be produced by the first and second switchers within the pulse reversal interval of the recording signal may be equal to n, a transfer rate convertor for varying the transfer rate T of the recording signal, a third switcher for switching connection between the first control pulse generator and the second control pulse generator, and a driver for driving the coil of the magnetic head in response to the control pulse from the first or second control pulse generators selected by the third switcher.

In the present invention, the logic for production of control pulses is set such that, where the encoded data have a pulse period of nT, the total number of control pulses (Sig3 and Sig5, or Sig4 and Sig6) for required switching elements may be smaller than n. Also, upon magnetic reversal, a control pulse signal (Sig3, Sig4) for a switching element for short-circuiting a terminal of a coil to a required power source is set to be outputted after an interval of time sufficient for the voltage at the terminal of the coil to reach a predetermined voltage elapses. Accordingly, it becomes possible to solve a difficulty in high rate recording which arises from the fact that the rise time $t_A$ is substantially fixed.

In the present invention, the control pulse generator includes a logic circuit having such production logic as just described and a second logic circuit in addition to a first logic circuit having a similar logical construction to that in the prior art, wherein either of the first or second logic circuits can be selectively used. Accordingly, a recording apparatus enabling high speed recording at a rate in a wide range from a normal rate to a high rate equal to or three times the normal rate can be realized.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a block diagram of a driving system for the magnetic head;

FIG. 14A is a waveform diagram of a Sig0 signal which is a recording signal in the construction of FIG. 13;

FIG. 14B is a waveform diagram of a clock signal in the construction of FIG. 13;

FIG. 14C is a waveform diagram of an output signal of a flip-flop $FF_1$ in the construction of FIG. 13;

FIG. 14D is a waveform diagram of an output signal of an exclusive OR gate $EX_1$ in the construction of FIG. 13;

FIG. 14E is a waveform diagram of an output signal of a flip-flop $FF_2$ in the construction of FIG. 13;

FIG. 14F is a waveform diagram of an output signal of an exclusive OR gate $EX_2$ in the construction of FIG. 13;

FIG. 14G is a waveform diagram of an output clock signal of an inverter $IV_{12}$ in the construction of FIG. 13;

FIG. 14H is a waveform diagram of an output clock signal of an AND gate $A_{11}$ of FIG. 13;

FIG. 14I is a waveform diagram of an output signal of an AND gate $A_{12}$ of FIG. 13;

FIG. 14J is a waveform diagram of an output signal Sig1;

FIG. 14K is a waveform diagram of an output signal Sig2;

FIG. 14L is a waveform diagram of an output signal Sig3;

FIG. 14M is a waveform diagram of an output signal Sig4;

FIG. 14N is a waveform diagram of an output signal Sig5;

FIG. 14O is a waveform diagram of an output signal Sig6;

FIG. 16A is a waveform diagram of the Sig1 signal when recording is performed at the three time clock rate in the construction of FIG. 13;

FIG. 16B is a waveform diagram of the Sig3 signal when recording is performed at the three time clock rate in the construction of FIG. 13;

FIG. 16C is a waveform diagram of the Sig5 signal when recording is performed at the three time clock rate in the construction of FIG. 13;

FIG. 16D is a waveform diagram of an electric current Ih flowing through a magnetic head when recording is performed at the three time clock rate in the construction of FIG. 13;

FIG. 16E is a waveform diagram of a head terminal voltage Vh when recording is performed at the three time clock rate in the construction of FIG. 13;

FIG. 18A is a waveform diagram of a Sig0 signal which is a recording signal in the construction of FIG. 17;

FIG. 18B is a waveform diagram of a clock signal in the construction of FIG. 17;

FIG. 18C is a waveform diagram of an output signal of a flip-flop $FF_{11}$ in the construction of FIG. 17;

FIG. 18D is a waveform diagram of an output signal of an exclusive OR gate $EX_1$ in the construction of FIG. 17;

FIG. 18E is a waveform diagram of an output signal of a flip-flop $FF_{12}$ in the construction of FIG. 17;

FIG. 18F is a waveform diagram of an output signal of a NOR gate $NR_1$ in the construction of FIG. 17;

FIG. 18G is a waveform diagram of an output clock signal of a flip-flop $FF_{13}$ in the construction of FIG. 17;

FIG. 18H is a waveform diagram of an output clock signal of an inverter $IV_{12}$ of FIG. 17;

FIG. 18I is a waveform diagram of an output clock signal of an AND gate $A_{11}$ of FIG. 17;

FIG. 18J is a waveform diagram of an output signal of an AND gate $A_{12}$ of FIG. 17;

FIG. 18K is a waveform diagram of an output signal Sig1;

FIG. 18L is a waveform diagram of an output signal Sig2;

FIG. 18M is a waveform diagram of an output signal Sig3;

FIG. 18N is a waveform diagram of an output signal Sig4;

FIG. 18O is a waveform diagram of an output signal Sig5;

FIG. 18P is a waveform diagram of an output signal Sig6;

FIG. 20A is a waveform diagram of the Sig1 signal when recording is performed at the three time clock rate in the construction of FIG. 17;

FIG. 20B is a waveform diagram of the Sig3 signal when recording is performed at the three time clock rate in the construction of FIG. 17;

FIG. 20C is a waveform diagram of the Sig5 signal when recording is performed at the three time clock rate in the construction of FIG. 17;

FIG. 20D is a waveform diagram of an electric current Ih flowing through a magnetic head when recording is performed at the three time clock rate in the construction of FIG. 17;

FIG. 20E is a waveform diagram of a head terminal voltage Vh when recording is performed at the three time clock rate in the construction of FIG. 17.

DETAILED DESCRIPTION OF THE PREFERRED EMBODIMENTS

Preferred embodiments of the present invention will be described below in the following order.

I. Construction of Recording and Reproduction Apparatus
II. First Embodiment
III. Second Embodiment
IV. Third Embodiment I. Construction of Recording and Reproduction Apparatus The construction of a recording and reproduction apparatus which is common to the embodiments is shown in FIG. 11.

Figure 11:
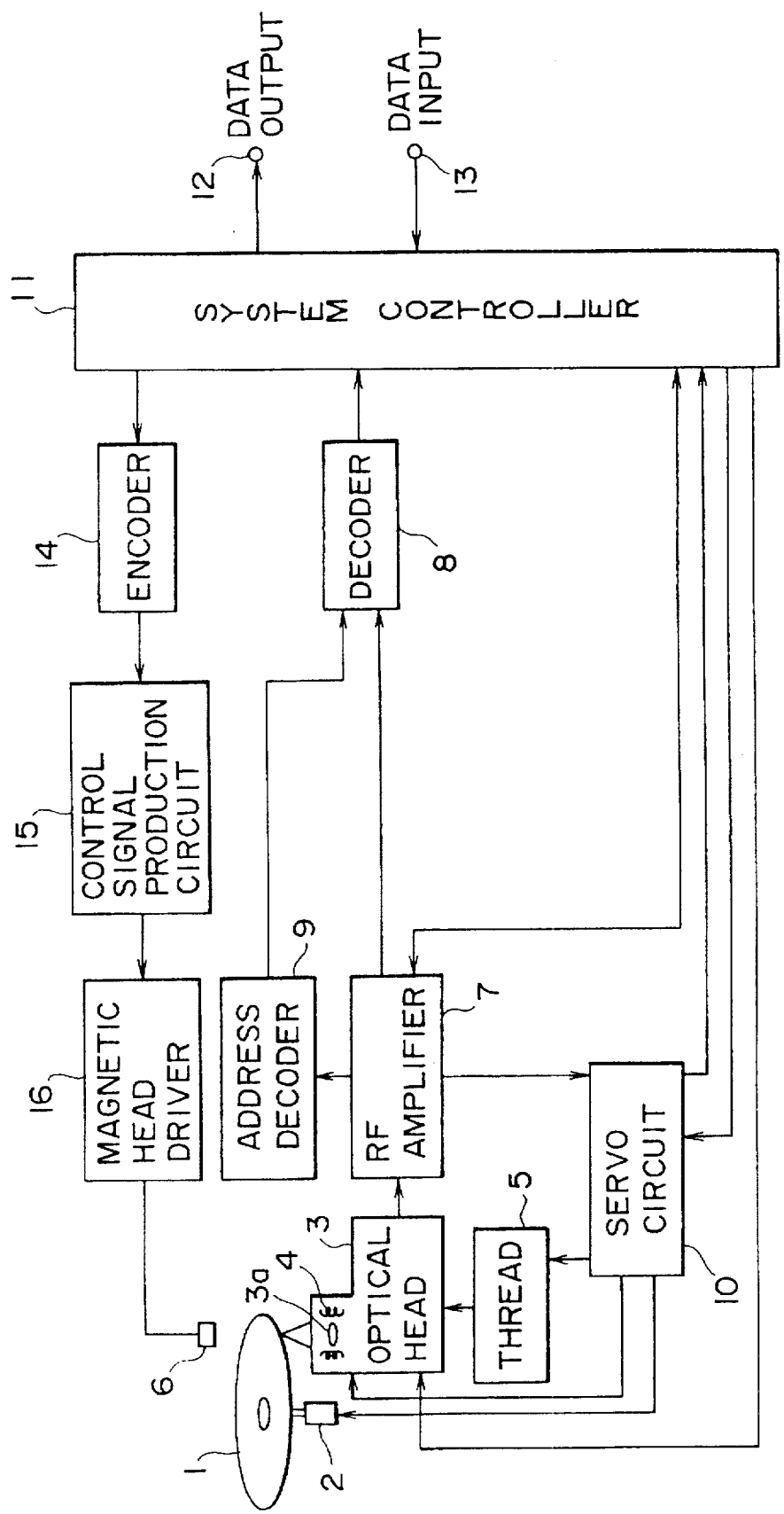
FIG. 11 is a block diagram showing a construction of a recording and reproduction apparatus of the present invention.

Referring to FIG. 11, the recording and reproduction apparatus is used to record and reproduce data onto and from a magneto-optical disk 1. The recording and reproduction apparatus includes a system controller 11 for controlling various operations thereof. The system controller 11 is formed from, for example, a microcomputer.

The recording and reproduction apparatus further includes a spindle motor 2 for rotating the disk 1 loaded thereon. An optical head 3 irradiates, upon recording or reproduction, a laser beam upon the disk 1. In particular, the optical head 3 outputs, upon recording, a laser beam of a high energy level to heat a recording track of the disk 1 to or higher than its Curie temperature. Upon reproduction, the optical head 3 outputs a laser beam of a comparatively low energy level to detect data from reflected light based on a magnetic Kerr effect.

The optical head 3 includes a laser diode serving as laser beam outputting means, an optical system including a polarization beam splitter, an objective lens and so forth, and a detector for detecting reflected light. The objective lens 3a is held for displacement in a radial direction of the disk 1 and another direction toward and away from the disk 1 by a biaxial mechanism 4. The entire optical head 3 is mounted for movement in a radial direction of the disk 1 by a thread mechanism 5.

A magnetic head 6 applies a magnetic field modulated in accordance with information supplied thereto to the magneto-optical disk 1. The magnetic head 6 is disposed in an opposing relationship to the optical head 3 across the disk 1.

Information detected from the disk 1 by the optical head 3 upon a reproduction operation is supplied to an RF amplifier 7. The RF amplifier 7 calculates the information supplied thereto to extract a reproduction RF signal, a tracking error signal, a focusing error signal and groove information. The groove information is originated from a serpentine groove formed with a predetermined frequency in advance on the disk 1 and also including address information recorded thereon. The reproduction RF signal thus extracted is supplied to a decoder section 8. Meanwhile, the tracking error signal and the focusing error signal are supplied to a servo circuit 10.

An address decoder 9 decodes the groove information to obtain absolute position information. Further, the address information recorded as data is extracted by the decoder section 8. The address information is supplied to the system controller 11, and is used for various controlling operations.

The servo circuit 10 generates various servo driving signals based on the tracking error signal and the focusing error signal supplied thereto from the RF amplifier 7. The servo circuit 10 also generates a track jumping instruction, an accessing instruction, rotational speed detection information and so forth supplied from the system controller 11. On the servo signals thus generated, the servo circuit 10 controls the biaxial mechanism 4 and the thread mechanism 5 to perform focusing and tracking control, and also controls the spindle motor 2 to rotate at a constant linear velocity (CLV).

The reproduction RF signal undergoes EFM demodulation, CIRC (Cross Interleaved Reed Solomon Code) decoding and so forth by the decoder section 8. The reproduction RF signal thus processed by the decoder section 8 is supplied as a reproduction data output to a predetermined processing section (not shown) from a terminal 12 by way of the system controller 11.

On the other hand, information supplied, upon recording operation, from a terminal 13 to the system controller 11 as information to be recorded onto the disk 1 undergoes encoding processing such as CIRC encoding, EFM modulation and so forth by an encoder section 14 to produce an EFM signal. The EFM signal is supplied to a control signal production circuit 15. The control signal production circuit 15 produces control signals (Sig1 to Sig6) based on the EFM signal and supplies them to a magnetic head driving circuit 16.

The magnetic head driving circuit 16 operates based on the control signals (Sig1 to Sig6) to allow an electric current to flow through a coil of the magnetic head 6 for applying a magnetic field of the N or S pole to the disk 1. Simultaneously, the system controller 11 supplies a control signal to the optical head 3 to output a laser beam of the recording level.

II. First Embodiment

Figure 12:
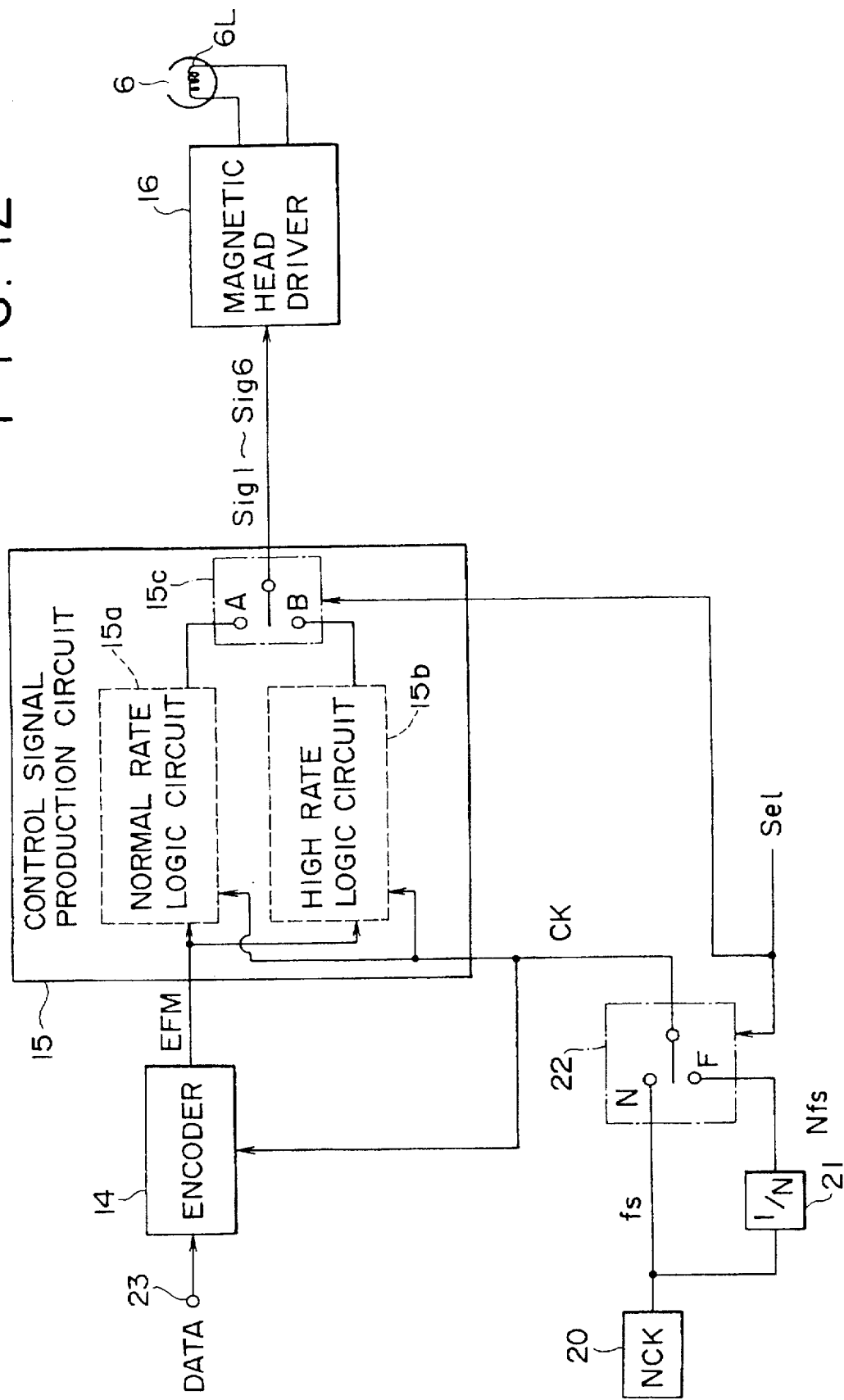
FIG. 12 is a block diagram showing an embodiment of a magnetic head driving circuit of the present invention.

FIG. 12 is a block diagram of a magnetic head driving system in the first embodiment of the present invention which is incorporated in the recording and reproduction apparatus having the construction described above.

Referring to FIG. 12, the magnetic head driving system has a terminal 23 to which recording data are supplied from the system controller 11. As described hereinabove, the encoder 14 performs CIRC encoding and EFM modulation for the recording data to produce an EFM signal and supplies the EFM signal to the control signal production circuit 15.

The control signal production circuit 15 includes a normal rate logic circuit 15a and a high rate logic circuit 15b. The EFM signal is supplied to both of the normal rate logic circuit 15a and the high rate logic circuit 15b.

The normal rate logic circuit 15a and the high rate logic circuit 15b produce and output control signals Sig1 to Sig6 with different logic constructions on the basis of the EFM signal.

The outputs of the normal rate logic circuit 15a and the high rate logic circuit 15b are selectively switched by a change-over circuit 15c and supplied to the magnetic head driving circuit 16. The magnetic head driving circuit 16 receives those of the control signals Sig1 to Sig6 produced by either the normal rate logic circuit 15a or the high rate logic circuit 15b selected by the change-over circuit 15c and operates based on the received control signals Sig1 to Sig6 to allow an electric current to flow through the coil 6L of the magnetic head 6.

A clock generation section 20 generates a clock signal for processing at a normal transfer rate, that is, for processing at a transfer rate at which the EFM signal is processed with the time base of T=230 nsec. A clock frequency variation section 21 produces, from the clock signal from the clock generation section 20, another clock signal of the three time rate, that is, a clock signal for processing at a transfer rate at which the EFM signal is processed with the time base of T=77 nsec.

One of the normal rate clock signal and the three time rate clock signal is selected by a switch 22 and supplied as a processing clock signal to the encoder 14 and the control signal production circuit 15. Changing of the switch 22 is performed, for example, in response to a change-over control signal Sel from the system controller 11. The change-over control signal Sel is supplied also to the change-over circuit 15c to change over the same.

When a recording operation at the normal rate is to be performed, the system controller 11 connects the switch 22 to the N terminal and the change-over circuit 15c to an A terminal using the change-over control signal Sel.

On the other hand, when a recording operation is to be performed, for example, at the three time rate, the system controller 11 connects the switch 22 to the F terminal and the change-over circuit 15c to a B terminal using the change-over control signal Sel.

In the magnetic head driving system of the present embodiment having such a construction as described above, the magnetic head driving circuit 16 may have a circuit construction, for example, similar to that described hereinabove with reference to FIG. 4. The switching elements $SW_1$ to $SW_6$ are controlled between on and off states in accordance with the control signals Sig1 to Sig6, respectively, and an electric current is supplied in a required direction to the coil 6L based on the operations of the switching elements $SW_1$ to $SW_6$.

Figure 5:
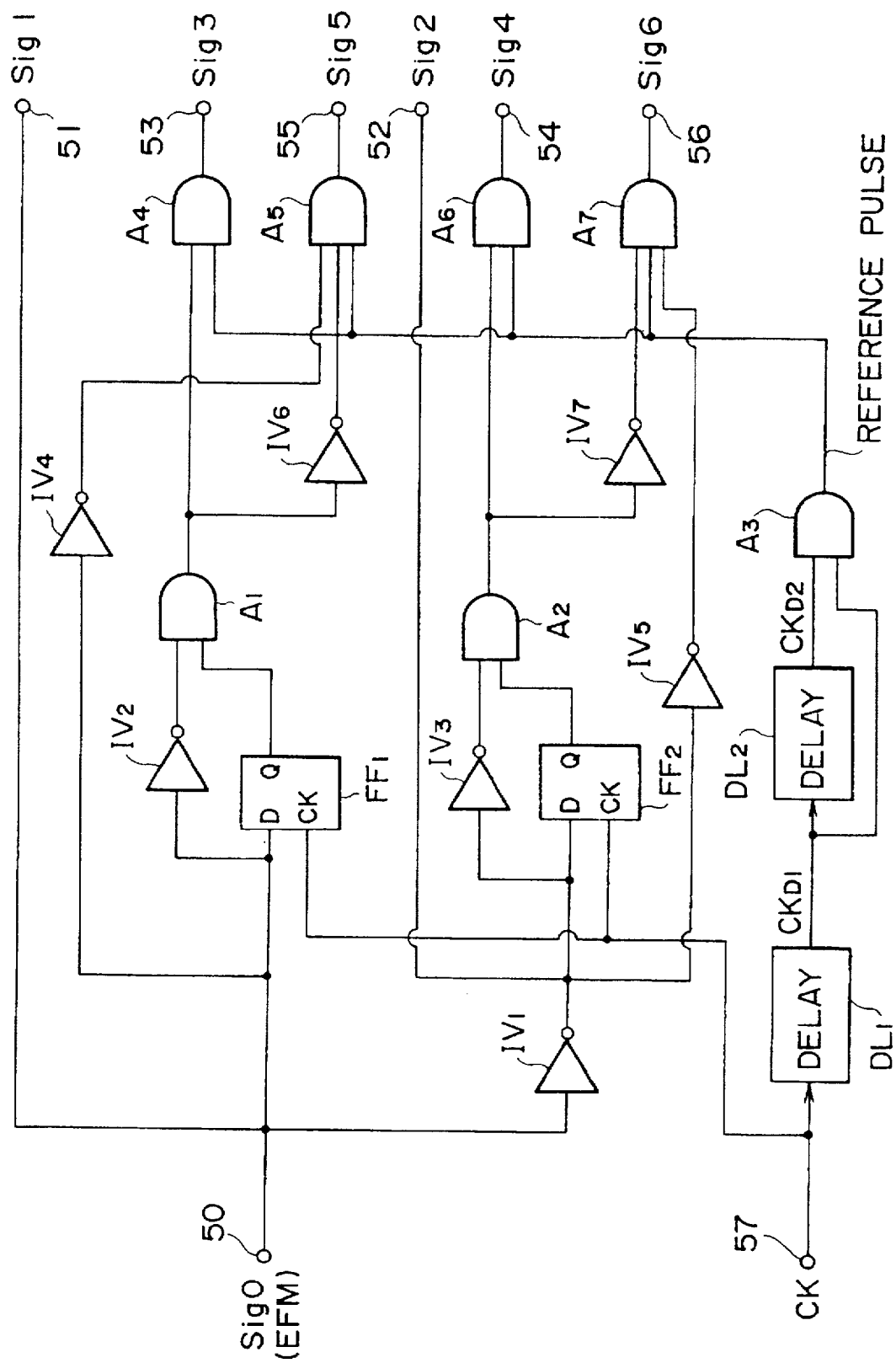
FIG. 5 is a detailed block diagram of a control signal production section shown in FIG. 4.

The normal rate logic circuit 15a in the control signal production circuit 15 has a similar construction to that of the logic circuit of FIG. 5.

Accordingly, in a recording operation at the normal rate wherein the A terminal is selected by the change-over circuit 15c and the switch 22 is connected at the N terminal, the control signals Sig1 to Sig6 from the normal rate logic circuit 15a are supplied to the magnetic head driving circuit 16, and the magnetic head driving circuit 16 operates in such a manner as described hereinabove with reference to FIGS. 8A to 8E. Overlapping description of the operation of the magnetic head driving circuit 16 in this instance is omitted herein.

In the present embodiment, if a recording operation is to be performed, for example, at the three time rate, the switch 22 is connected at the F terminal so that the transfer rate is raised to three times. Further, the B terminal of the change-over circuit 15c is selected so that the control signals Sig1 to Sig6 from the high rate logic circuit 15b are supplied to the magnetic head driving circuit 16 having the construction of FIG. 4.

Figure 13:
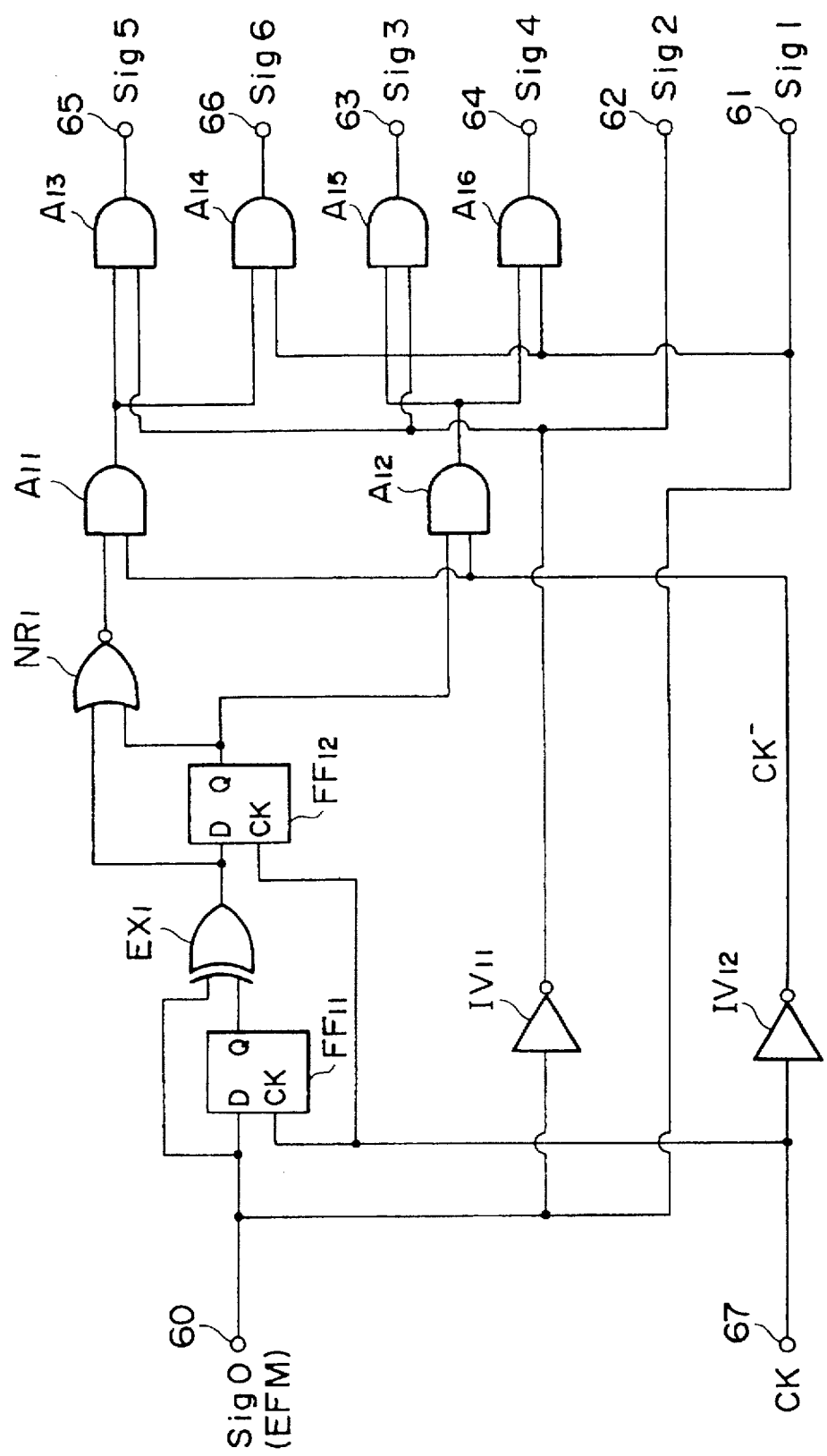
FIG. 13 is a detailed block diagram of a control signal production circuit of the magnetic head driving circuit of the present invention.

The high rate logic circuit 15b is so constructed as shown in FIG. 13 and produces the control signals Sig1 to Sig6 using the EFM signal (Sig0) and the clock signal CK of the three time rate.

Referring to FIG. 13, the high rate logic circuit 15b has a terminal 60 to which the EFM signal is supplied as the signal Sig0. The high rate logic circuit 15b has another terminal 67 to which the clock signal CK is supplied by way of the switch 22 of FIG. 12.

The high rate logic circuit 15b includes inverters $IV_{11}$ and $IV_{12}$, flip-flops $FF_{11}$ and $FF_{12}$, AND gates $A_{11}$ to $A_{16}$, an exclusive OR gate $EX_1$ and a NOR gate $NR_1$. The high rate logic circuit 15b has output terminals 61 to 66 for control signals Sig1 to Sig6, respectively.

Operation of the high rate logic circuit 15b of FIG. 13 will be described subsequently with reference to FIGS. 14A to 14O.

It is assumed that such a signal Sig0 (EFM signal) as seen in FIG. 14A is supplied from the terminal 60 and such a clock signal CK as seen in FIG. 14B is supplied from the terminal 67. Reference characters $t_1$, $t_2$ and $t_3$ indicate reversal timings of the EFM signal, and it is assumed that the signal Sig0 of FIG. 14A exhibits a reversal interval of 3T between the timings $t_1$ and $t_2$ and another reversal interval of 4T between the timings $t_2$ and $t_3$.

The signal Sig0 is first supplied directly to the terminal 61 and makes such a control signal Sig1 as seen in FIG. 14J.

The signal Sig0 is logically inverted by the inverter $IV_{11}$ and supplied to the terminal 62 so that it makes such a control signal Sig2 as seen in FIG. 14K.

The signal Sig0 is supplied to the D terminal of the flip-flop $FF_{11}$ and the exclusive OR gate $EX_1$. The flip-flop $FF_{11}$ performs a latching operation in response to the clock signal CK and outputs such a Q output as shown in FIG. 14C. The Q output of the flip-flop $FF_{11}$ is supplied to the exclusive OR gate $EX_1$.

The exclusive OR gate $EX_1$ performs exclusive-OR operation for the Q output of the flip-flop $FF_{11}$ of FIG. 14C and the signal Sig0 and provides such an output as shown in FIG. 14D. The output of the exclusive OR gate $EX_1$ shown in FIG. 14D is supplied to the D terminal of the flip-flop $FF_{12}$ and the NOR gate $NR_1$. The flip-flop $FF_{12}$ performs a latching operation in response to the clock signal CK and provides such a Q output as shown in FIG. 14E. The Q output of the flip-flop $FF_{12}$ is supplied to the NOR gate $NR_1$ and the AND gate $A_{12}$.

The NOR gate $NR_1$ performs NOR-operation for the output of the exclusive OR gate $EX_1$ shown in FIG. 14D and the Q output of the flip-flop $FF_{12}$ shown in FIG. 14E and provides such an output as shown in FIG. 14F. The output of the NOR gate $NR_1$ is supplied to the AND gate $A_{11}$.

The clock signal CK from the terminal 67 is inverted by the inverter $IV_{12}$ to form such an inverted clock signal $CK^-$ as seen in FIG. 14G. The inverted clock signal $CK^-$ is supplied to the AND gate $A_{11}$ and the AND gate $A_{12}$.

The AND gate $A_{11}$ performs AND-operation for the output of the NOR gate $NR_1$ and the inverted clock signal $CK^-$ to produce such a logical AND output as shown in FIG. 14H.

Meanwhile, the AND gate $A_{12}$ performs AND-operation for the Q output of the flip-flop $FF_{12}$ and the inverted clock signal $CK^-$ to produce such a logical AND output as shown in FIG. 14I.

The AND gate $A_{15}$ performs AND-operation for the output of the AND gate $A_{12}$ of FIG. 14I and the output of the inverter $IV_{11}$ (which has the same waveform as the control signal Sig2) to produce such a control signal Sig3 as show in FIG. 14L. The control signal Sig3 is outputted from the terminal 63.

The AND gate $A_{16}$ performs AND-operation for the output of the AND gate $A_{12}$ of FIG. 14I and the signal Sig0 to produce such a control signal Sig4 as shown in FIG. 14M. The control signal Sig4 is outputted from the terminal 64.

The AND gate $A_{13}$ performs AND-operation for the output of the AND gate $A_{11}$ of FIG. 14H and the output of the inverter $IV_{11}$ (which has the same waveform as the control signal Sig2) to produce such a control signal Sig5 as shown in FIG. 14N. The control signal Sig5 is outputted from the terminal 65.

The AND gate $A_{14}$ performs AND-operation for the output of the AND gate $A_{11}$ and the signal Sig0 to produce such a control signal Sig6 as shown in FIG. 14O. The control signal Sig6 is outputted from the terminal 66.

Figure 1:
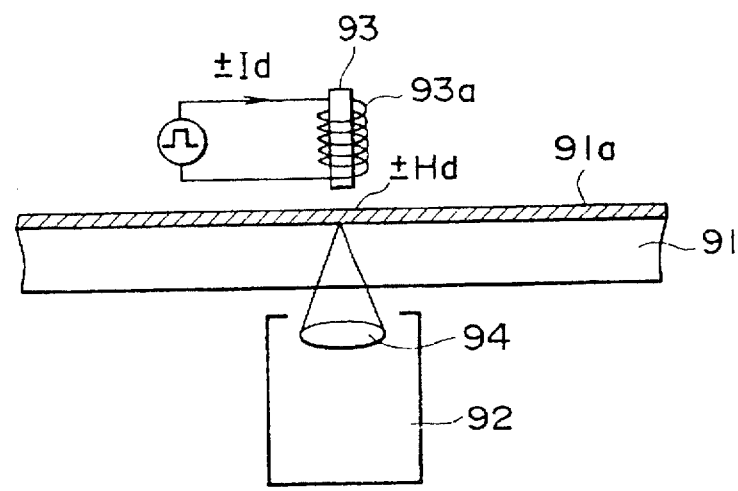
FIG. 1 is a schematic view showing an arrangement of an optical head and a magnetic head with respect to a magneto-optical recording medium in a magnetic modulation system.
Figure 2A:
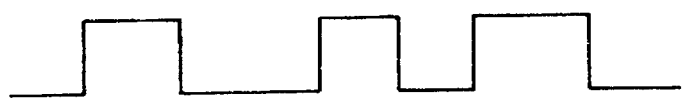
FIG. 2A is a waveform diagram of a recording signal in the magnetic modulation system.
Figure 2B:
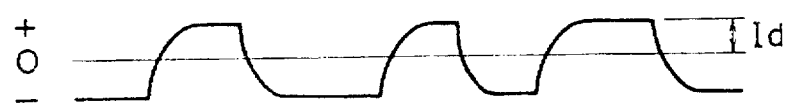
FIG. 2B is a waveform diagram of an electric current flowing through the magnetic head in the magnetic modulation system.
Figure 2C:
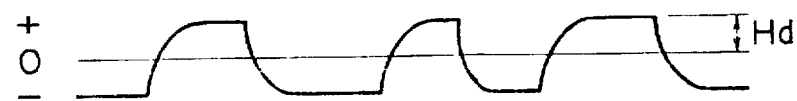
FIG. 2C is a waveform diagram of a magnetic field of the magnetic head in the magnetic modulation system.
Figure 4:
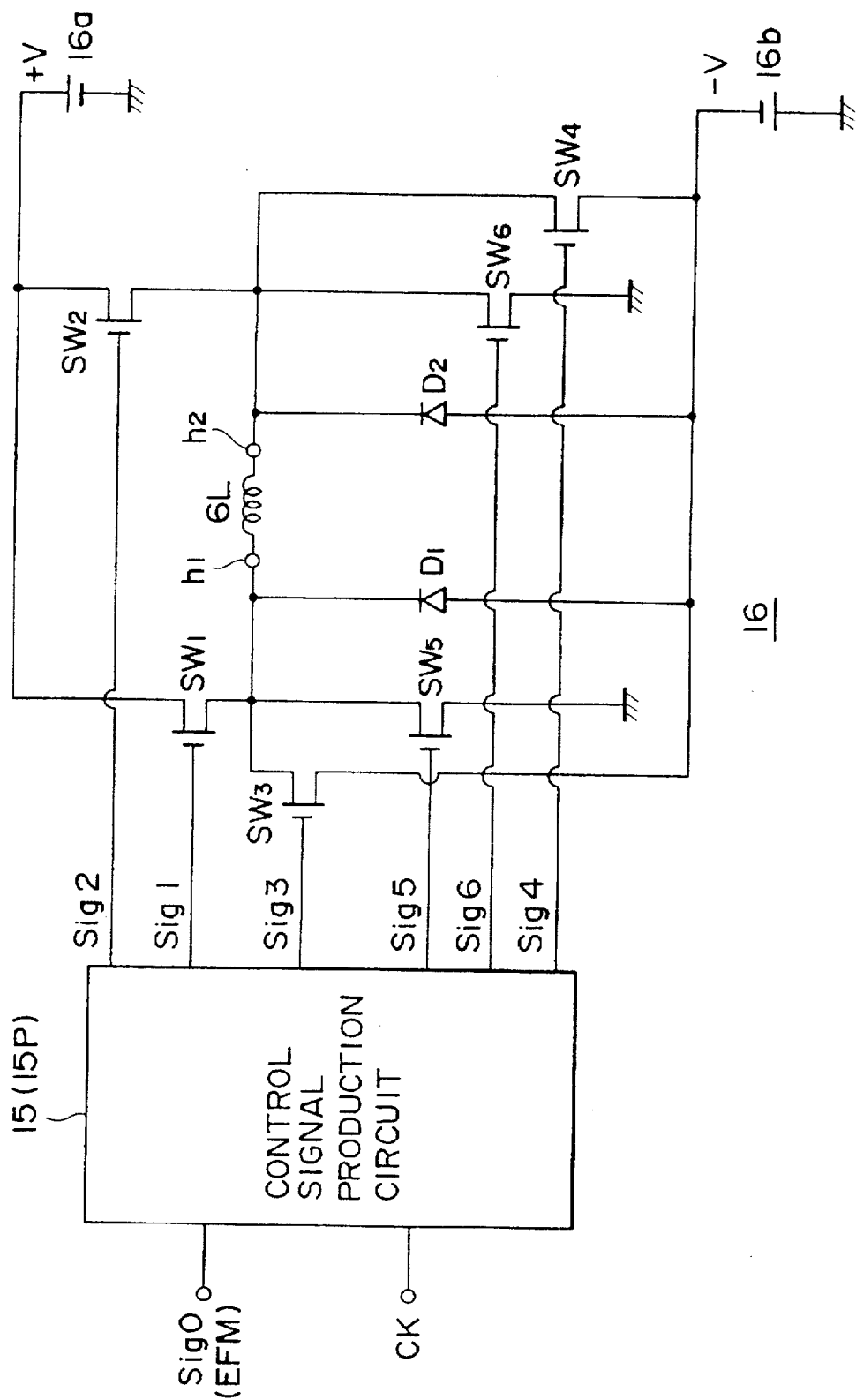
FIG. 4 is a detailed block diagram of a magnetic head driving circuit shown in FIG. 3.
Figure 6:
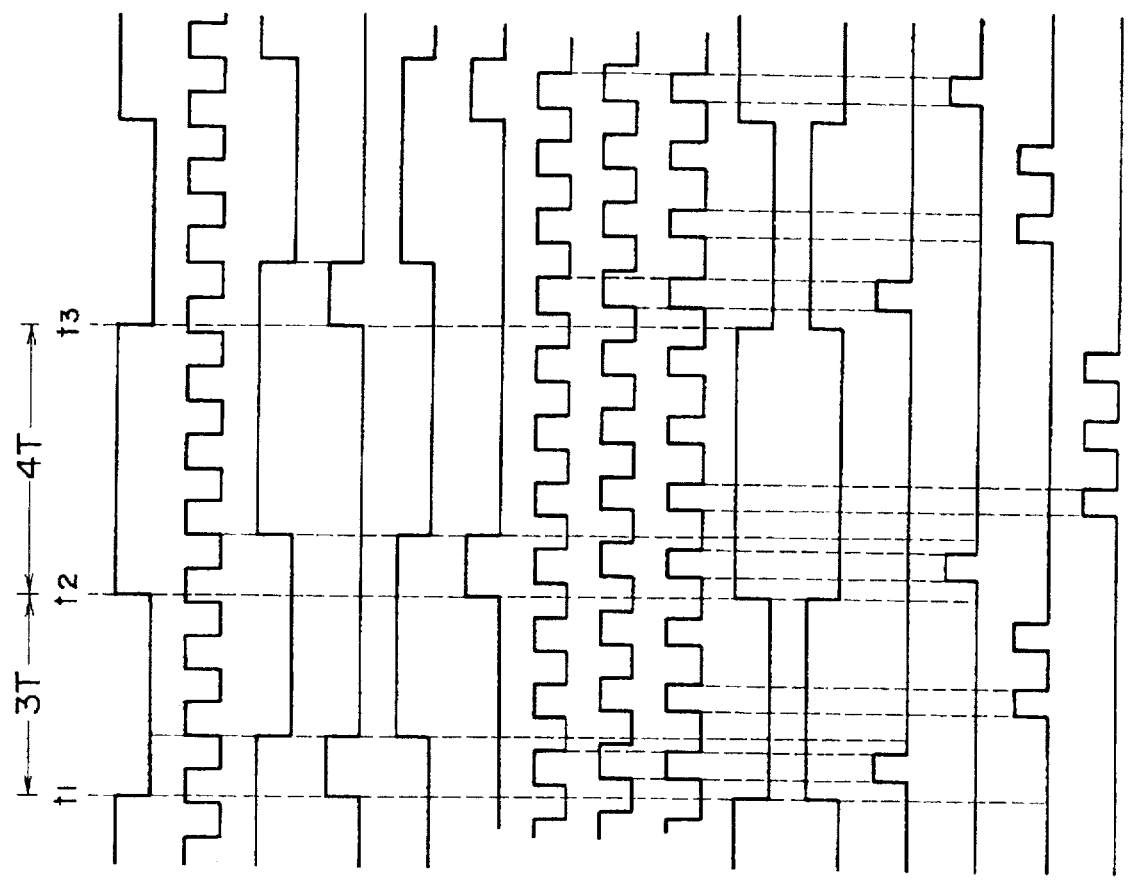
FIG. 6A is a waveform diagram of a Sig0 signal which is a recording signal.
FIG. 6B is a waveform diagram of a clock signal.
FIG. 6C is a waveform diagram of an output signal of a flip-flop $FF_1$ of FIG. 5.
FIG. 6D is a waveform diagram of an output signal of an AND gate $A_1$ of FIG. 5.
FIG. 6E is a waveform diagram of an output signal of a flip-flop $FF_2$ of FIG. 5.
FIG. 6F is a waveform diagram of an output signal of an AND gate $A_2$ of FIG. 5.
FIG. 6G is a waveform diagram of an output clock signal of a delay circuit $DL_1$ of FIG. 5.
FIG. 6H is a waveform diagram of an output clock signal of a delay circuit $DL_2$ of FIG. 5.
FIG. 6I is a waveform diagram of an output signal of an AND gate $A_3$ of FIG. 5.
FIG. 6J is a waveform diagram of an output signal Sig1.
FIG. 6K is a waveform diagram of an output signal Sig2.
FIG. 6L is a waveform diagram of an output signal Sig3.
FIG. 6M is a waveform diagram of an output signal Sig4.
FIG. 6N is a waveform diagram of an output signal Sig5.
FIG. 6O is a waveform diagram of an output signal Sig6.
Figure 7:
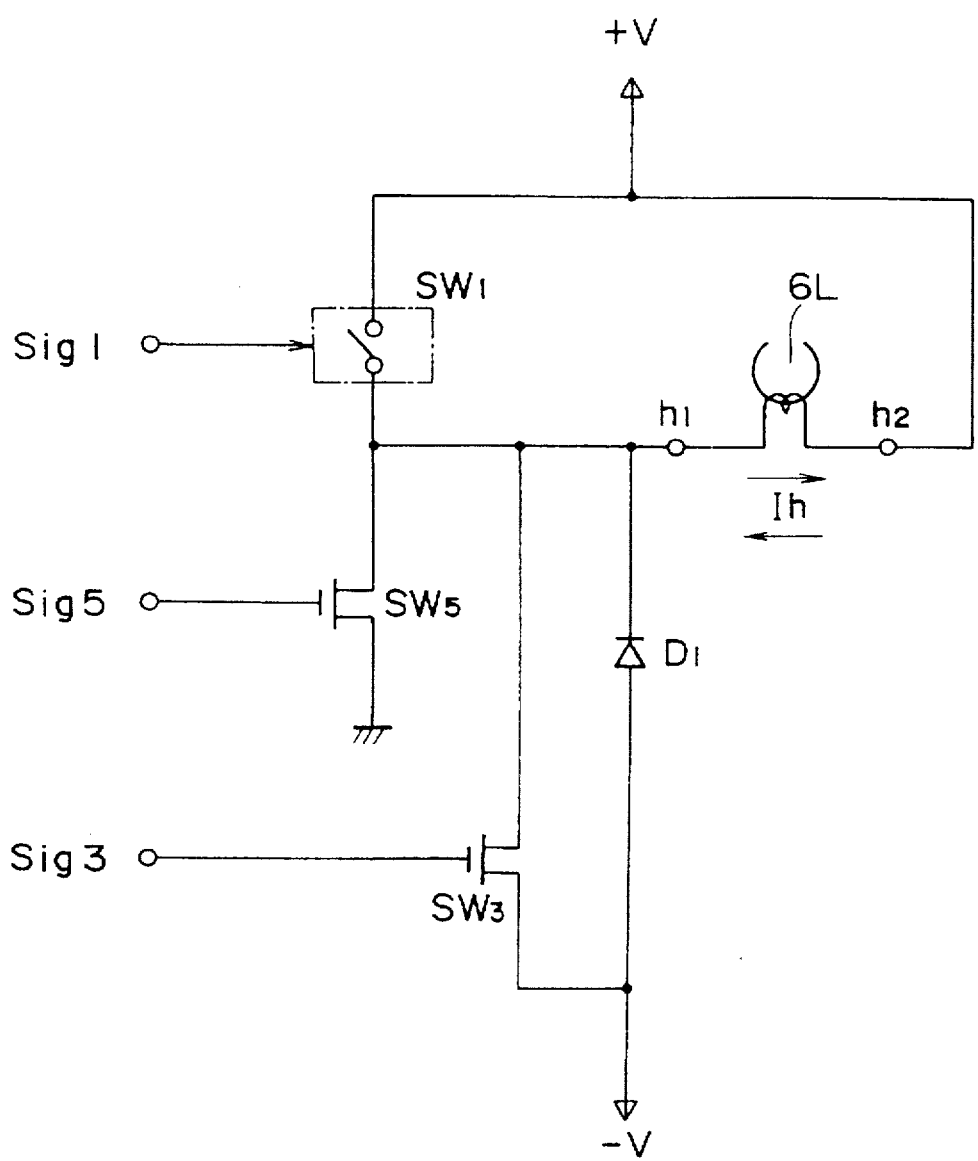
FIG. 7 is a circuit diagram showing an equivalent circuit upon magnetic reversal.
Figure 8:
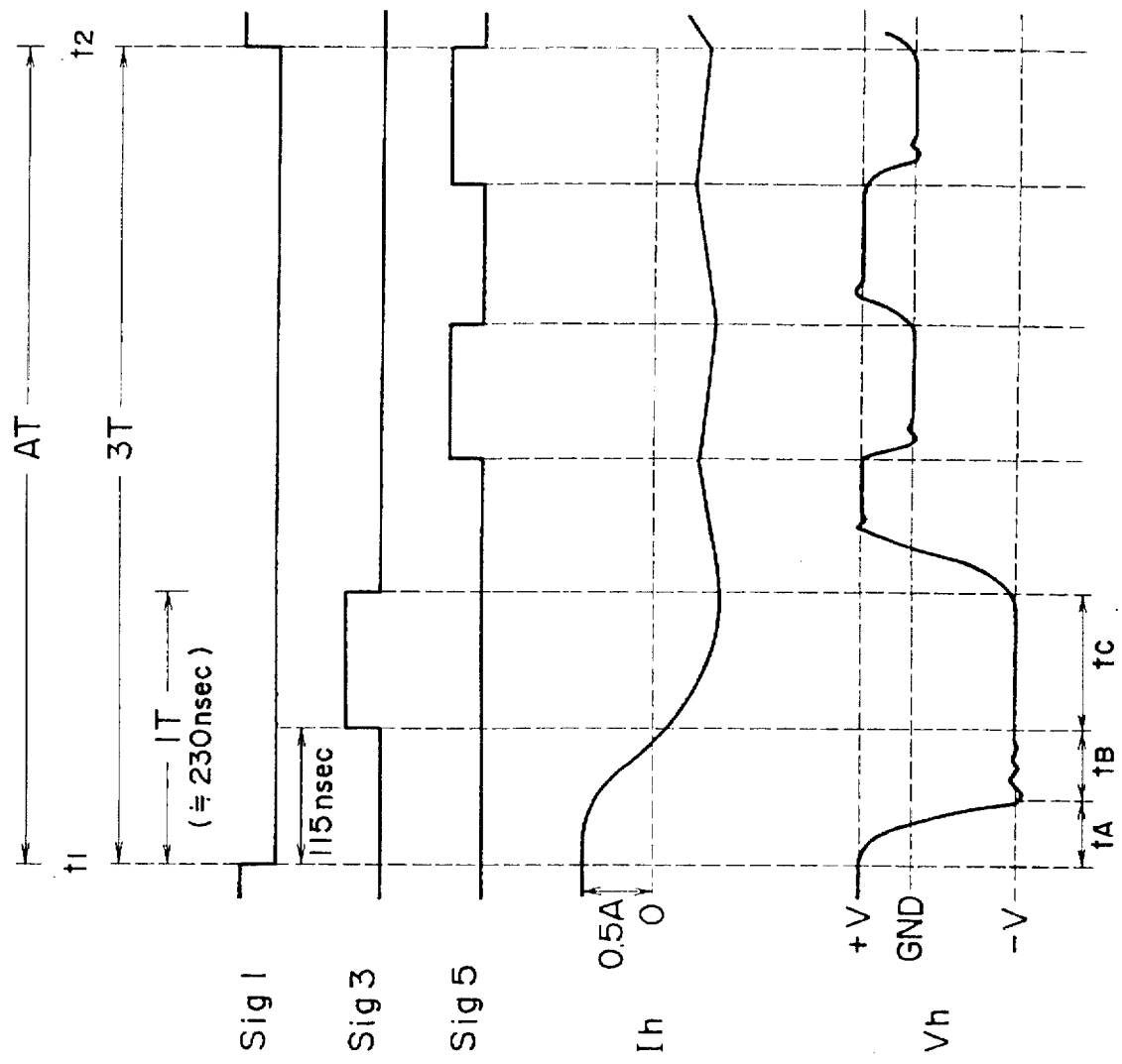
FIG. 8A is a waveform diagram of the Sig1 signal when recording is performed at a normal clock rate.
FIG. 8B is a waveform diagram of the Sig3 signal when recording is performed at the normal clock rate.
FIG. 8C is a waveform diagram of the Sig5 signal when recording is performed at the normal clock rate.
FIG. 8D is a waveform diagram of an electric current Ih flowing through the magnetic head when recording is performed at the normal clock rate.
FIG. 8E is a waveform diagram of a head terminal voltage Vh when recording is performed at the normal clock rate.
Figure 9:
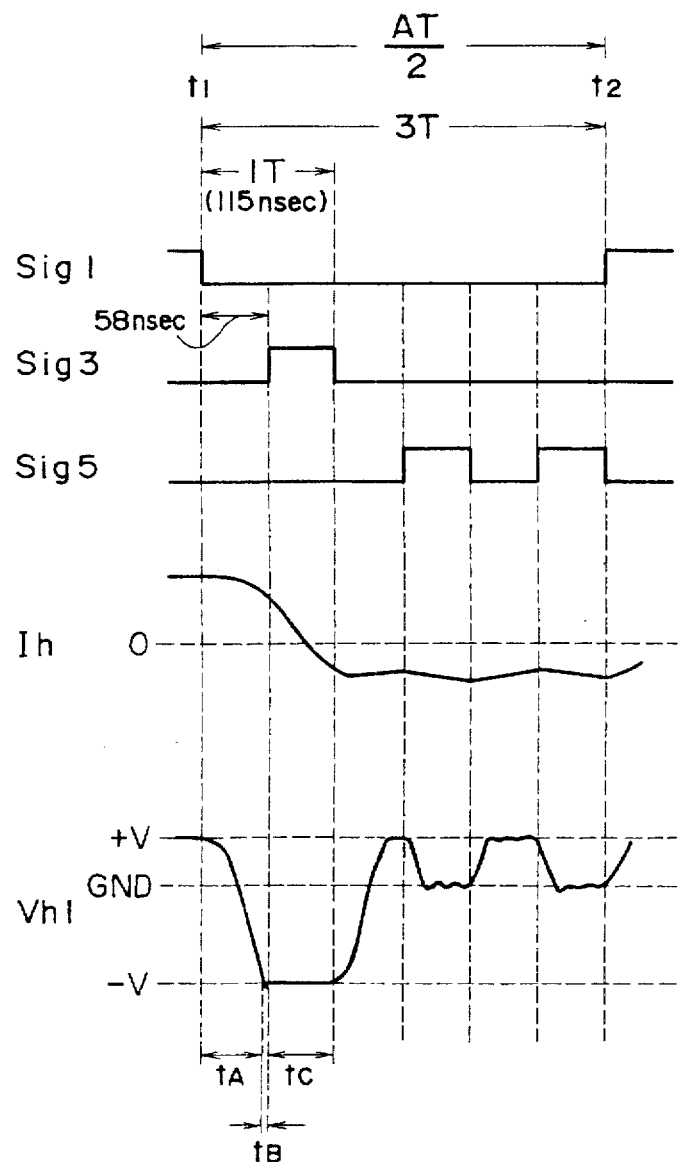
FIG. 9A is a waveform diagram of the Sig1 signal when recording is performed at a two time clock rate.
FIG. 9B is a waveform diagram of the Sig3 signal when recording is performed at the two time clock rate.
FIG. 9C is a waveform diagram of the Sig5 signal when recording is performed at the two time clock rate.
FIG. 9D is a waveform diagram of the electric current Ih flowing through the magnetic head when recording is performed at the two time clock rate.
FIG. 9E is a waveform diagram of the head terminal voltage Vh when recording is performed at the two time clock rate.
Figure 10:
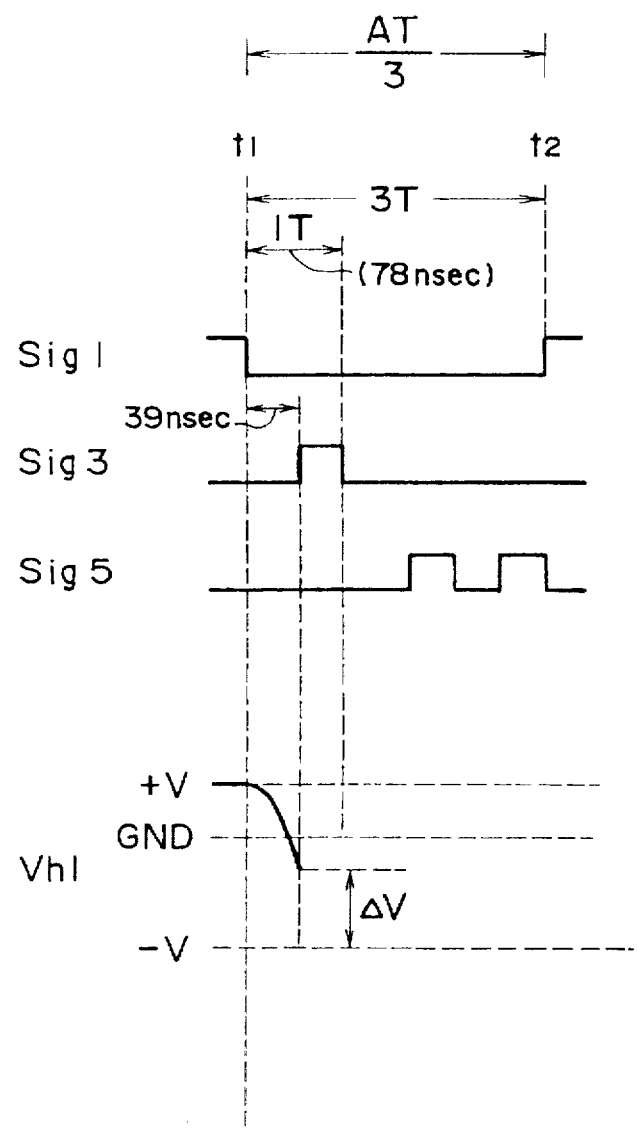
FIG. 10A is a waveform diagram of the Sig1 signal when recording is performed at a three time clock rate.
FIG. 10B is a waveform diagram of the Sig3 signal when recording is performed at the three time clock rate.
FIG. 10C is a waveform diagram of the Sig5 signal when recording is performed at the three time clock rate.
FIG. 10D is a waveform diagram of the head terminal voltage Vh when recording is performed at the three time clock rate.

The control signals Sig1 to Sig6 produced by the high rate logic circuit 15b having the logical construction described above are supplied as control pulses to the magnetic head driving circuit 16, that is, to the switching elements $SW_1$ to $SW_6$ of the magnetic head driving circuit 16 of FIG. 4. Rising timings of the signal Sig3 to the switching element $SW_3$ for short-circuiting the head terminal $h_1$ to the $-V$ power source within a "L" level period of the EFM signal and the control signal Sig4 to the switching element $SW_4$ for short-circuiting the head terminal h2 to the −V power source within a "H" level period of the EFM signal are later than a timing after at least more than 1T elapses after a reversal timing of the EFM signal. Accordingly, even when a recording operation is performed at the three time rate wherein 1T=78 nsec, the period from a point of time of a reversal to a rising edge of the control signal Sig3 or Sig4 can be set at least to a period longer than 78 nsec. Thus, the rising time is retarded compared to the control signal Sig3 or Sig4 (illustrated in FIG. 6L or 6M) by the normal rate logic circuit 15a.

The number of pulses which exhibit the high level within one reversal period, that is, the total number of pulses of the control signals Sig3 and Sig5 which exhibit the "H" level within the "H" level period of the EFM signal or pulses of the control signals Sig4 and Sig6 which exhibit the "H" level within the "L" period of the EFM signal, is smaller than n where the reversal period is represented by nT.

FIGS. 15A, 15B, 15C and 15D show waveforms of the control signals Sig1, Sig3 and Sig5 within the "H" level period of the EFM signal when the "H" level period is 3T, 4T, 5T and 1T, respectively.

Figure 15A:
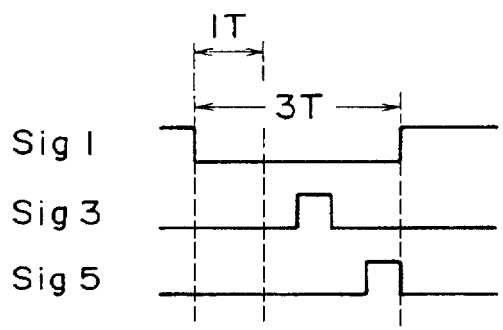
FIG. 15A is a waveform diagram of waveforms of the Sig1 signal, the Sig3 signal and the Sig5 signal when an EFM signal exhibits a "HH" level for 3T.
Figure 15B:
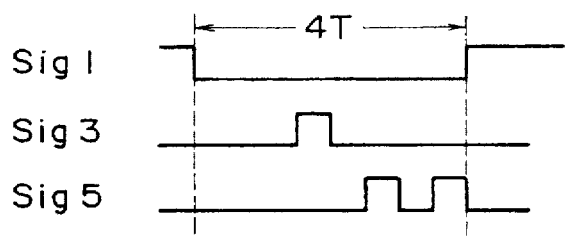
FIG. 15B is a waveform diagram of waveforms of the Sig1 signal, the Sig3 signal and the Sig5 signal when the EFM signal exhibits the "H" level for 4T.
Figure 15C:
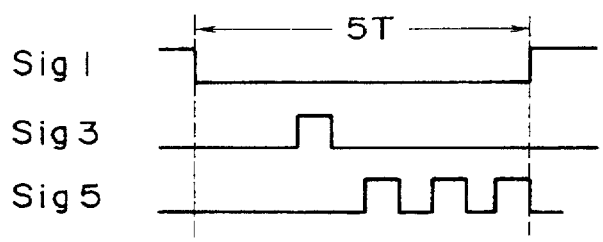
FIG. 15C is a waveform diagram of waveforms of the Sig1 signal, the Sig3 signal and the Sig5 signal when the EFM signal exhibits the "H" level for 5T.
Figure 15D:
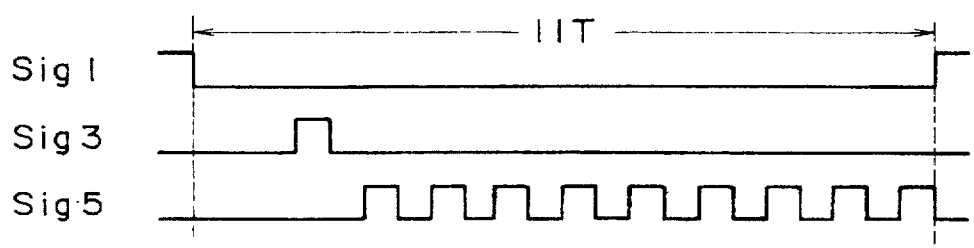
FIG. 15D is a waveform diagram of waveforms of the Sig1 signal, the Sig3 signal and the Sig5 signal when the EFM signal exhibits the "H" level for 11T.

As can be seen from FIGS. 15A, 15B, 15C and 15D, the control signal Sig3 rises after an elapse of a time of approximately 1.5T since a falling edge of the control signal Sig1. When the "H" level period is 3T, the total pulse number of the control signals Sig3 and Sig5 is 2 as can be seen from FIG. 15A and is smaller than "3" of 3T. Similarly, when the "H" level period is 11T, the total pulse number of the control signals Sig3 and Sig5 is 1+9=10 as seen in FIG. 15D and smaller than "11" of 1T.

Operation of the magnetic head driving circuit 16 based on the control signals Sig1 to Sig6 produced by the high rate logic circuit 15b will be described with reference to FIGS. 16A to 16E. These figures take as an example the points of time $t_1$ and $t_2$ between which the EFM signal exhibits a minimum reversal interval of 3T.

Signals which are outputted at the "H" level from the control signal production circuit 15 during a period within which the EFM signal (=control signal Sig1) exhibits the "L" level are the control signals Sig3 and Sig5. The control signals Sig3 and Sig5 have such waveforms as seen in FIG. 15A. Those signals are shown in FIGS. 16A, 16B and 16C with the time base in recording operation at the three time rate. In this instance, T=78 nsec.

FIGS. 16D and 16E show timing charts of the head current Ih flowing through the coil 6L and the voltage $Vh_1$ at the head terminal $h_1$. It is assumed that the peak value of the head current Ih is 0.5 A, and +V in the waveform diagram of the voltage $Vh_1$ is approximately +5 V and −V is approximately −45 V.

Similarly as in the description given with reference to FIGS. 8A to 8E hereinabove, when the control signal Sig1 is reversed to the "L" level at the point of time $t_1$, the switching elements $SW_1$, $SW_3$ and $SW_5$ are all turned off, and the head terminal $h_1$ is disconnected from any voltage source. Meanwhile, since the switching element $SW_2$ is on, the head terminal $h_2$ is fixed to the +V voltage. Movement of charge is governed by an electromotive force produced by an inductance of the coil 6L to tend to continue to flow the charge in the direction of the head terminal $h_1 \rightarrow h_2$. Consequently, an operation is performed in a direction in which charge is sucked from the head terminal $h_1$ and discharged to the terminal of the head terminal $h_2$. Since the head terminal $h_2$ is fixed to the +V voltage, the charge flows back to the +V voltage source (positive dc power source 16a) side.

Since the head terminal $h_1$ side is disconnected from all of the voltage sources, it sucks charge from a small floating capacitance. Accordingly, the voltage $Vh_1$ of the head terminal $h_1$ drops rapidly. As the voltage drop proceeds, the coil current Ih decreases little by little. Thus, an operation which can be seen from a $t_A$ period of FIG. 16E is performed.

Here, as can be seen from comparison with FIGS. 10A to 10D, in the present embodiment, the switching element $SW_3$ is not turned on in response to the control signal Sig3 until the voltage drops to the −V potential and is then fixed to the voltage source of −V by the diode $D_1$. The switching element $SW_3$ is turned on in response to the control signal Sig3 only after an elapse of the period of $t_z$, indicated in FIG. 16B, since a falling edge of the control signal Sig1. When the switching element $SW_3$ is turned on, the head terminal $h_1$ is short-circuited to the −V power source (negative dc power source 16b), and the voltage $Vh_1$ is hereafter fixed to −V.

The rise time $t_A$ is approximately 50 nsec similar to the case of the normal rate described hereinabove with reference to FIGS. 8A to 8E. In the case of FIGS. 10A to 10D, an operation is disabled because the control signal Sig3 rises before an elapse of approximately 50 nsec. In the present embodiment, however, the control signal Sig3 rises after an elapse of a sufficiently longer time than 50 nsec (in the present embodiment, $t_z$=approximately 117 nsec). Consequently, at a point of time at which the control signal Sig3 rises, the voltage $Vh_1$ of the head terminal $h_1$ is substantially at the −V potential. The switching element $SW_3$ can be thus turned on at a point of time after the difference between the voltage $Vh_1$ and the −V potential has been eliminated. Accordingly, an appropriate operation by a high speed switching element is realized.

After the control signal Sig3 changes to the "L" level, the head current Ih is kept substantially fixed by the control signal Sig5.

As described above, in the present embodiment, by employing the high rate logic circuit 15b, a recording operation at a three time rate, which has conventionally been impossible, can be performed without any modification to the construction of the magnetic head driving circuit 16 or the magnetic head 6. A recording operation at a rate higher than the three time rate can be of course realized.

III. Second Embodiment

A second embodiment of the present invention will be described below. It is to be noted that the magnetic head driving system has the construction of FIG. 12, similar to that in the first embodiment.

In the present embodiment, the high rate logic circuit 15b is different from that in the first embodiment.

Figure 17:
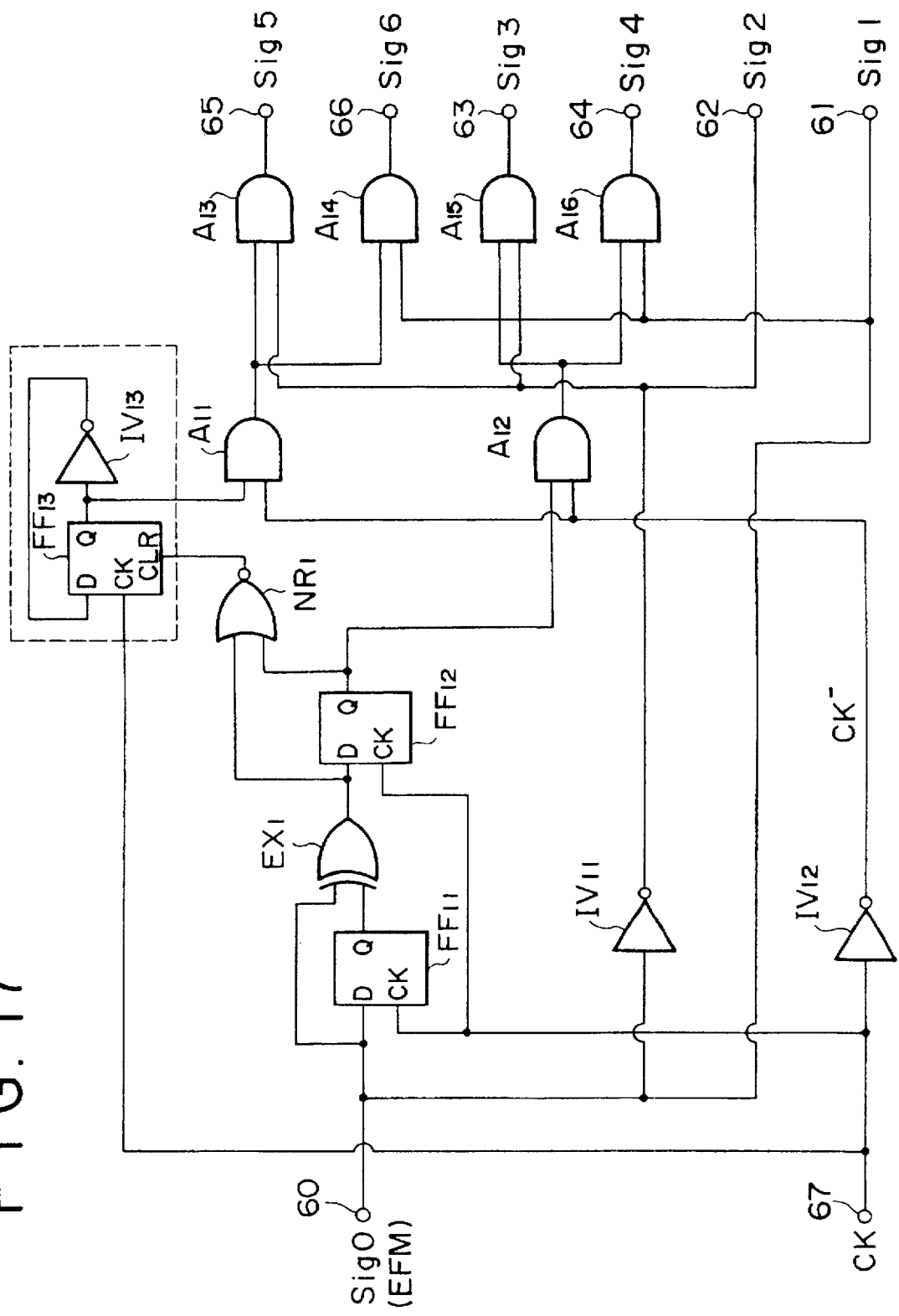
FIG. 17 is a detailed block diagram of a control signal production circuit of a magnetic head driving circuit of a second embodiment of the present invention.
Figure 19A:
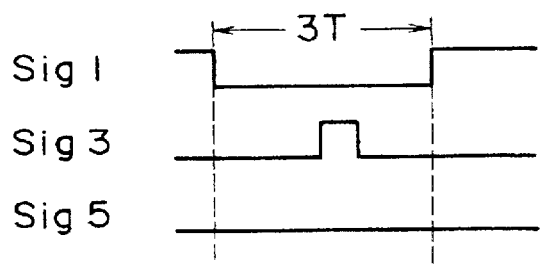
FIG. 19A is a waveform diagram of waveforms of the Sig1 signal, the Sig3 signal and the Sig5 signal when an EFM signal exhibits a "H" level for 3T in the construction shown in FIG. 17.
Figure 19B:
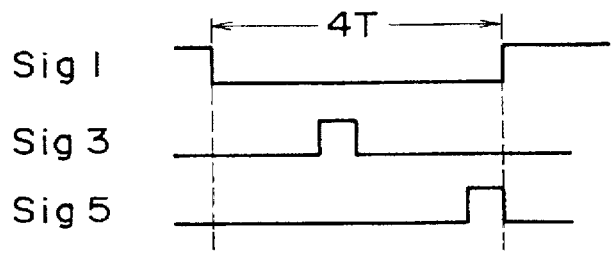
FIG. 19B is a waveform diagram of waveforms of the Sig1 signal, the Sig3 signal and the Sig5 signal when the EFM signal exhibits the "H" level for 4T in the construction shown in FIG. 17.
Figure 19C:
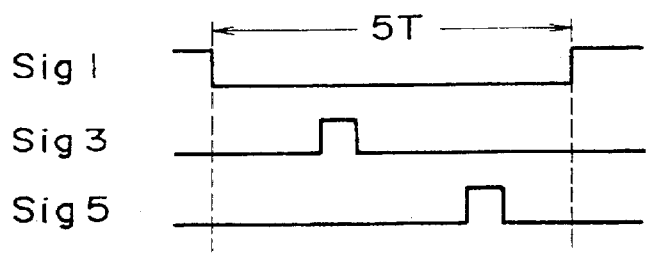
FIG. 19C is a waveform diagram of waveforms of the Sig1 signal, the Sig3 signal and the Sig5 signal when the EFM signal exhibits the "H" level for 5T in the construction shown in FIG. 17.
Figure 19D:
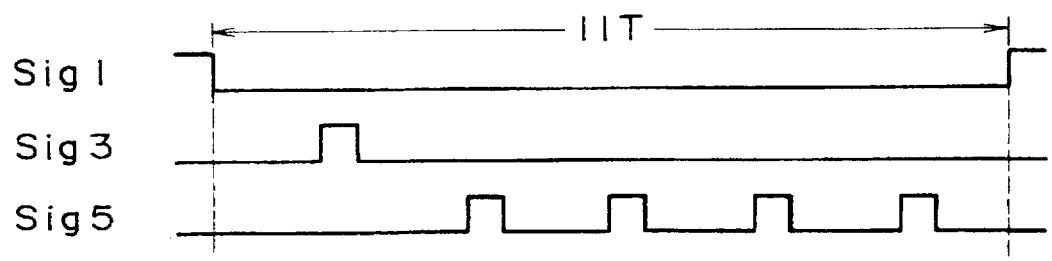
FIG. 19D is a waveform diagram of waveforms of the Sig1 signal, the Sig3 signal and the Sig5 signal when the EFM signal exhibits the "H" level for 11T in the construction shown in FIG. 17.

The high rate logic circuit 15b has a construction shown in FIG. 17 for producing control signals Sig1 to Sig6 using an EFM signal (Sig0) and a clock signal CK of the three time rate.

In addition, like elements to those of the circuit of FIG. 13 are denoted by like reference characters and overlapping description thereof is omitted. Referring to FIG. 17, the high rate logic circuit 15b is different in construction from that of FIG. 12 in that it additionally includes a flip-flop $FF_{13}$ and an inverter $IV_{13}$, which are surrounded by a broken line in FIG. 17, and the output of the NOR gate $NR_1$ is used as a clear signal for the flip-flop $FF_{13}$ and the Q output of the flip-flop $FF_{13}$ is supplied to the AND gate $A_{11}$.

Operation of the high rate logic circuit 15b of FIG. 17 will be described below with reference to FIGS. 18A to 18F.

It is to be noted that description of the waveforms of FIGS. 18A to 18F is omitted here since they are similar to those of FIGS. 14A to 14F, respectively.

A clock signal CK is supplied to the flip-flop $FF_{13}$. The Q output of the flip-flop $FF_{13}$ is inverted by the inverter $IV_{13}$ and supplied to the D terminal of the flip-flop $FF_{13}$. Since the output of the NOR gate $NR_1$ shown in FIG. 18F is used as a clear signal for the flip-flop $FF_{13}$, the Q output of the flip-flop $FF_{13}$ exhibits such a waveform as shown in FIG. 18G. The Q output of the flip-flop $FF_{13}$ is supplied to the AND gate $A_{11}$. The AND gate $A_{11}$ performs an AND-operation for the Q output of the flip-flop $FF_{13}$ and an inverted clock signal of FIG. 18H, which is the output of the invertor $IV_{12}$, to provide such an output as shown in FIG. 18I.

The output of the AND gate $A_{11}$ is supplied to the AND gates $A_{13}$ and $A_{14}$ and used for production of control signals Sig5 and Sig6, respectively. In particular, the AND gate $A_{13}$ performs AND-operation for the output of the AND gate $A_{11}$ and the output of the inverter $IV_{11}$ (which has the same waveform as the control signal Sig2) to produce such a control signal Sig5 as shown in FIG. 18O. Meanwhile, the AND gate $A_{14}$ performs an AND-operation for the output of the AND gate $A_{11}$ and the signal Sig0 to produce such a control signal Sig6 as shown in FIG. 18P.

The other control signals Sig1 to Sig4 are such as shown in FIGS. 18K to 18N and are similar to the control signals Sig1 to Sig4 of FIGS. 14J to 14M, respectively.

Of the control signals produced by the high rate logic circuit 15b in this manner, the waveforms of the control signals Sig1, Sig3 and Sig5 within a "H" level period of the EFM signal are shown in FIGS. 19A to 19D when the "H" level period is 3T, 4T, 5T and 11T, respectively.

As can be seen from FIGS. 19A to 19D, also in the present embodiment, the control signal Sig3 rises after an elapse of a time of approximately 1.5T since a falling edge of the control signal Sig1. Further, when the "H" level period is 3T, the total pulse number of the control signals Sig3 and Sig5 is 1 as seen from FIG. 19A and is smaller than "3" of 3T. Similarly, when the "H" level period is 11T, the total pulse number of the control signals Sig3 and Sig5 is 5 as seen from FIG. 19D and is smaller than "11" of 11T.

Operation of the magnetic head driving circuit 16 based on the control signals Sig1 to Sig6 produced by the high rate logic circuit 15b is illustrated in FIGS. 20A to 20E. These figures take as an example the points of time $t_1$ and $t_2$ illustrated in FIGS. 18A to 18P between which the EFM signal exhibits a minimum reversal interval of 3T upon recording operation at the three time rate (T=78 nsec).

Also in this instance, the switching element $SW_3$ is not turned on in response to the control signal Sig3 until the voltage of the head terminal $h_1$ drops to the $-V$ potential and is then fixed to the voltage source of $-V$ by the diode $D_1$. Then, the switching element $SW_3$ is turned on in response to the control signal Sig3 only after an elapse of an interval of time indicated by tz in FIG. 20B since a falling edge of the control signal Sig1. When the switching element $SW_3$ is turned on, the head terminal $h_1$ is short-circuited to the $-V$ power source (negative dc power source 16b) so that the voltage $Vh_1$ is thereafter fixed to $-V$.

In particular, while the rise time $t_A$ is approximately 50 nsec also in the present embodiment, the control signal Sig3 rises after an elapse of a sufficiently longer time ($t_z$ = approximately 117 ns) than 50 nsec. As a result, at a point of time when the control signal Sig3 rises, the voltage $Vh_1$ of the head terminal $h_1$ is substantially equal to the $-V$ potential. In other words, at a point of time after the difference between the voltage $Vh_1$ and the $-V$ potential has been eliminated, the switching element $SW_3$ can be turned on. Accordingly, an appropriate operation by a high speed switching element can be realized.

As described above, in the case of using the high rate logic circuit 15b in the second embodiment, a recording operation at a three time rate, which has conventionally been impossible, can be performed without any modification to the construction of the magnetic head driving circuit 16 or the magnetic head 6. A recording operation at a rate higher than the three time rate can be of course realized.

IV. Third Embodiment

Figure 21:
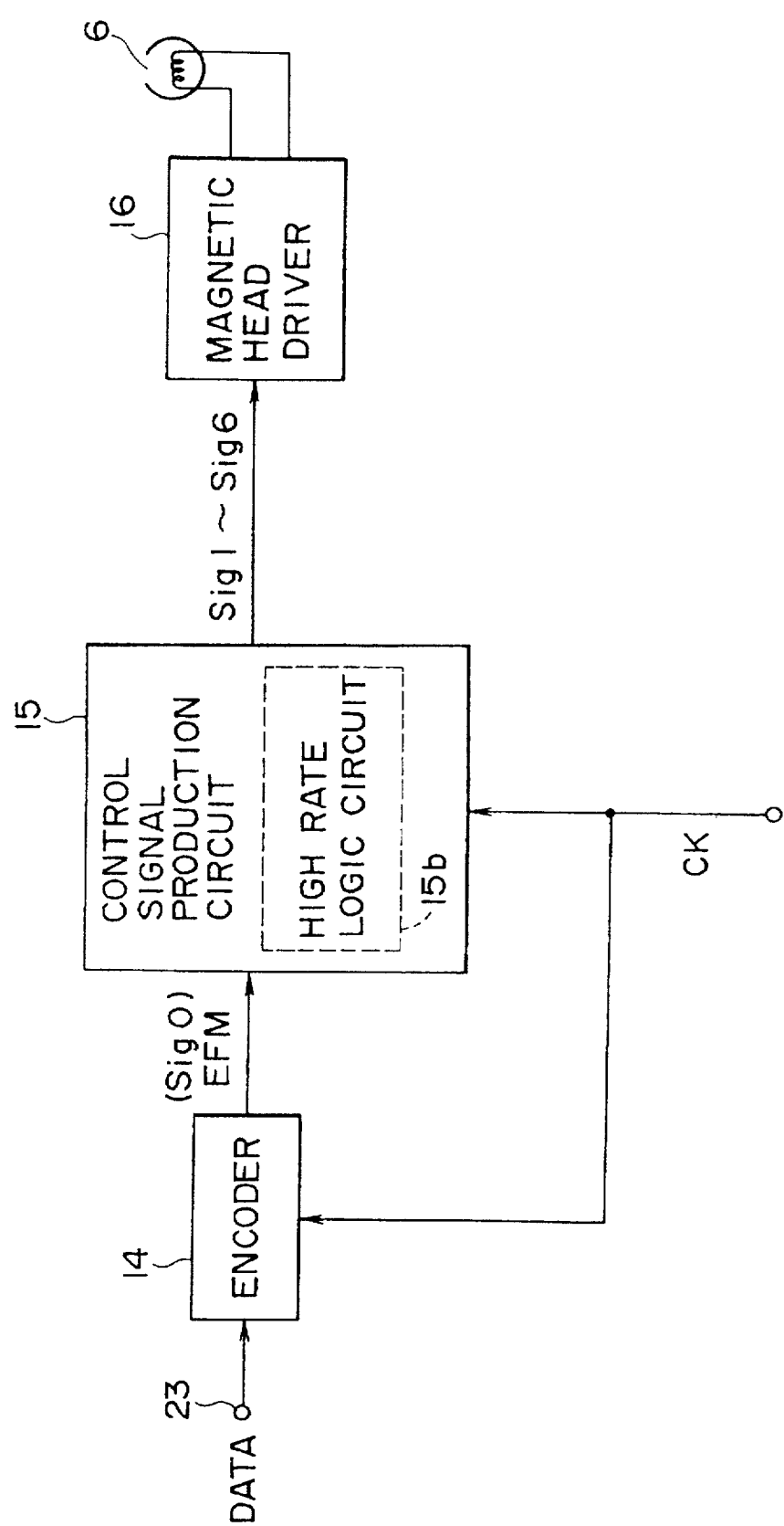
FIG. 21 is a detailed block diagram of a control signal production circuit of a magnetic head driving circuit of a third embodiment of the present invention.

A magnetic head driving system as a third embodiment of the present invention is shown in FIG. 21. In the present embodiment, the control signal production circuit 15 does not include a normal rate logic circuit but includes only the high rate logic circuit 15b.

The high rate logic circuit 15b may be so constructed as shown in FIG. 13 or 17.

The present embodiment is constructed as a recording apparatus for exclusive use for a high rate.

It is to be noted that, also in this instance, the frequency of the clock signal CK is made variable so that the recording apparatus may operate at a plurality of different transfer rates.

It is to be noted that, while the several embodiments are described above, the present invention may be embodied in various other modifications.

In the present invention, the requirement to make it possible to use a high speed switching element is that, if it is presumed that the inductance L of a magnetic head is approximately 5 µH, the interval of time until the switching element $SW_3$ ($SW_4$) is turned on in response to the control signal Sig3 (Sig4) after a signal reversal, that is, the interval of time within which the terminal is in a high impedance condition, should be longer than at least 50 nsec. Further, the upper limit to the interval of time is an interval of time until the direction of the electric current reverses itself, and if this is taken into consideration, the upper limit is approximately 150 nsec.

In the embodiments described above, the present invention has been described with respect to a magneto-optical disk system; however, the present invention can be realized as a magneto-optical recording apparatus for any other system.

What is claimed is:

1. A magnetic head driving circuit, comprising:
   means for providing at least a first power source voltage and a second power source voltage, wherein said second power source voltage is of opposite polarity with respect to said first power source voltage;
   first switching means for switching connection to one end of a coil of a magnetic head at least between said first and second power source voltages;
   second switching means for switching connection to the other end of said coil of said magnetic head at least between said first and second power source voltages;
   control pulse production means for producing a control pulse for controlling said first and second switching means so that a total number of control pulses to be produced by said first and second switching means within a pulse reversal interval, which is given by n×T, of a recording signal may be smaller than n, T being a transfer rate of the recording signal, n being a positive integral number; and
   driving means for driving said first and second switching means in response to the control pulse from said control pulse production means.

2. A magnetic head driving circuit, comprising:
   means for providing at least a first power source voltage and a second power source voltage, wherein said second power source voltage is of opposite polarity with respect to said first power source voltage;

first switching means for switching connection to one end of a coil of a magnetic head at least between said first and second power source voltages;

second switching means for switching connection to the other end of said coil of said magnetic head at least between said first and second power source voltages;

control pulse production means for producing a control pulse for controlling said first switching means so that said second power source voltage may be connected to the one end of said coil of said magnetic head or another control signal for controlling said second switching means so that said second power source voltage may be connected to the other end of said coil of said magnetic head after a delay of a predetermined time since a reversal edge of a pulse reversal interval, which is given by n×T, of a recording signal, T being a transfer rate of the recording signal, n being a positive integral number; and driving means for driving said first and second switching means in response to the control pulse from said control pulse production means.

3. A magnetic head driving circuit, comprising:

means for providing at least a first power source voltage and a second power source voltage wherein said second power source voltage is of opposite polarity with respect to said first power source voltage;

first switching means for switching connection to one end of a coil of a magnetic head at least between said first and second power source voltages;

second switching means for switching connection to the other end of said coil of said magnetic head at least between said first and second power source voltages;

first control pulse production means for producing a control pulse for controlling said first and second switching means so that a total number of control pulses to be produced by said first and second switching means within a pulse reversal interval, which is given by n×T, of a recording signal may be smaller than n, T being a transfer rate of the recording signal, n being a positive integral number;

second control pulse production means for producing a control pulse for controlling said first and second switching means so that the total number of control pulses to be produced by said first and second switching means within the pulse reversal interval of the recording signal may be equal to n;

transfer rate variation means for varying the transfer rate T of the recording signal;

third switching means for switching connection between said first control pulse production means and said second control pulse production means; and driving means for driving said coil of said magnetic head in response to the control pulse from said first or second control pulse production means selected by said third switching means.

* * * * *